United States Patent
Son

(10) Patent No.: US 9,845,966 B2
(45) Date of Patent: Dec. 19, 2017

(54) AIR CONDITIONING SYSTEM

(71) Applicant: LG ELECTRONICS INC., Seoul (KR)

(72) Inventor: Sanghye Son, Seoul (KR)

(73) Assignee: LG ELECTRONICS INC., Seoul (KR)

(*) Notice: Subject to any disclaimer, the term of this patent is extended or adjusted under 35 U.S.C. 154(b) by 229 days.

(21) Appl. No.: 14/710,369

(22) Filed: May 12, 2015

(65) Prior Publication Data

US 2015/0323208 A1 Nov. 12, 2015

(30) Foreign Application Priority Data

May 12, 2014 (KR) .................. 10-2014-0056793

(51) Int. Cl.
*F24F 11/00* (2006.01)
*G05B 15/02* (2006.01)
*F24F 3/044* (2006.01)

(52) U.S. Cl.
CPC ............ *F24F 11/006* (2013.01); *F24F 3/044* (2013.01); *F24F 11/0012* (2013.01);
(Continued)

(58) Field of Classification Search
CPC ...... F24F 11/006; F24F 3/044; F24F 11/0086; F24F 11/0076; F24F 11/0012;
(Continued)

(56) References Cited

U.S. PATENT DOCUMENTS 4,841,733 A * 6/1989 Dussault .............. F24F 5/0071
165/223
5,228,306 A * 7/1993 Shyu ..................... F24F 1/027
236/49.3
(Continued)

FOREIGN PATENT DOCUMENTS

EP 0 892 330 A1 1/1999
KR 10-2007-0058139 A 6/2007
(Continued)

OTHER PUBLICATIONS

Korean Office Action issued in Application No. 10-2014-0056793 dated Jun. 20, 2015.
(Continued)

*Primary Examiner* — Ramesh Patel
(74) *Attorney, Agent, or Firm* — KED & Associates LLP

(57) ABSTRACT

An air conditioning system includes an air handling unit (AHU) configured to control outdoor air that is externally supplied, exhaust air that is discharged from indoors to outdoors, and return air that is circulated indoors and supplied again, control the outdoor air or mixed air of the return air and the outdoor air at a set temperature, and supply cool/warm supply air indoors, at least one outdoor unit configured to supply a refrigerant to the AHU, a controller configured to control the AHU through communication with the outdoor unit, and an interface unit configured to operate as an input/output unit of the controller. The interface unit displays setting menus for devices forming the AHU, sets basis data for controlling the devices in response to data received through the setting menus, inputs the set basis data to the controller, and outputs a control menu and a monitoring menu in accordance with functions of the AHU changed according to a configuration of the plurality of devices.

20 Claims, 27 Drawing Sheets

(52) U.S. Cl.
CPC ...... *F24F 11/0076* (2013.01); *F24F 11/0086* (2013.01); *G05B 15/02* (2013.01); *F24F 2011/0013* (2013.01); *F24F 2011/0047* (2013.01); *F24F 2011/0063* (2013.01); *F24F 2011/0064* (2013.01); *F24F 2011/0068* (2013.01); *F24F 2011/0075* (2013.01); *F24F 2011/0091* (2013.01); *Y02B 30/767* (2013.01)

(58) Field of Classification Search
CPC ....... F24F 2011/0091; F24F 2011/0063; F24F 2011/0013; F24F 2011/0047; F24F 2011/0064; F24F 2011/0068; F24F 2011/0075; G05B 15/02; Y02B 30/767
See application file for complete search history.

(56) References Cited

U.S. PATENT DOCUMENTS

| | | | | |
|---|---|---|---|---|
| 5,971,287 | A * | 10/1999 | Kettner | B60H 1/00742 165/230 |
| 6,219,590 | B1 * | 4/2001 | Bernaden, III | F24F 11/0086 700/277 |
| 6,282,910 | B1 * | 9/2001 | Helt | F24F 11/0079 62/229 |
| 6,408,228 | B1 * | 6/2002 | Seem | F24F 11/0086 700/276 |
| 8,442,694 | B2 * | 5/2013 | Jang | F24F 11/006 236/47 |
| 2004/0112082 | A1 * | 6/2004 | Tanimoto | F25B 13/00 62/510 |
| 2008/0183424 | A1 | 7/2008 | Seem | |
| 2010/0082162 | A1 * | 4/2010 | Mundy | F24F 3/044 700/277 |
| 2010/0307733 | A1 * | 12/2010 | Karamanos | F24F 11/006 165/254 |
| 2011/0093121 | A1 * | 4/2011 | Wakuta | F24F 11/006 700/276 |
| 2011/0185302 | A1 * | 7/2011 | Kalapodas | G06F 3/0481 715/771 |
| 2011/0264274 | A1 | 10/2011 | Grabinger et al. | |
| 2013/0178987 | A1 * | 7/2013 | Meirav | F24F 11/0001 700/276 |
| 2014/0031989 | A1 * | 1/2014 | Bergman | G05D 23/19 700/276 |
| 2014/0260692 | A1 * | 9/2014 | Sharp | G01N 1/2273 73/863.23 |
| 2015/0323207 | A1 * | 11/2015 | Son | F24F 11/0012 700/276 |

FOREIGN PATENT DOCUMENTS

| | | |
|---|---|---|
| KR | 10-2009-0037228 A | 4/2009 |
| KR | 10-2009-0043878 A | 5/2009 |
| KR | 10-2010-0091004 A | 8/2010 |
| KR | 10-2014-0046713 A | 4/2014 |

OTHER PUBLICATIONS

European Search Report for Application 15167284.7 dated Dec. 22, 2015.

* cited by examiner

AIR CONDITIONING SYSTEM

CROSS-REFERENCE TO RELATED APPLICATION(S)

This application claims the priority benefit of Korean Patent Application No. 10-2014-0056793, filed on May 12, 2014 in the Korean Intellectual Property Office, the disclosure of which is incorporated herein by reference.

BACKGROUND

1. Field

The present invention relates to an air conditioning system and, more particularly, to an air conditioning system for ventilating the interior of a room and controlling an indoor temperature by controlling air that is circulated and returned back and air that is received from the outside.

2. Background

An air conditioner is installed in order to control an indoor temperature by discharging cool or hot air to the interior of a room in order to create a comfortable indoor environment and to provide a more comfortable indoor environment to the human being by purifying indoor air. In general, the air conditioner includes an indoor unit configured to include a heat exchanger and installed indoors and an outdoor unit configured to include a compressor and a heat exchanger and to supply the indoor unit with a refrigerant.

The air conditioner is separated into the indoor unit including the heat exchanger and the outdoor unit including the compressor and the heat exchanger and controlled. The air conditioner operates by controlling power supplied to the compressor or the heat exchanger. Furthermore, in the air conditioner, at least one indoor unit may be connected to the outdoor unit. The air conditioner may operate in cooling or heating mode by supplying a refrigerant to the indoor unit depending on a requested operation state.

The air conditioner performs a cooling operation or a heating operation depending on the flow of a refrigerant. In the cooling operation, when a high-temperature and high-pressure liquid refrigerant is supplied from the compressor of the outdoor unit to the indoor unit through the heat exchanger of the outdoor unit, the refrigerant is expanded by the heat exchanger of the indoor unit and evaporated, an temperature of surrounding air drops, the fan of the indoor unit is rotated, and thus cold air is discharged to the interior of a room. In the heating operation, when a high-temperature and high-pressure gaseous refrigerant is supplied from the compressor of the outdoor unit to the indoor unit, air that is heated by energy emitted as the high-temperature and high-pressure gaseous refrigerant is liquefied in the heat exchanger of the indoor unit is discharged to the interior of a room according to the operation of the fan of the indoor unit.

Recently, such an air conditioner is combined with a ventilation system for discharging indoor air to the outside, receiving external air, and ventilating warm indoor air in addition to control of an indoor temperature by discharging cool or hot air to the interior of a room. In particular, in a building not having a window or having a window of a small size, a system in which a cooling and heating system and a ventilation system have been combined has been in the spotlight.

Accordingly, there is a need for a system for improving heat efficiency by cooling and heating the interior of a room more efficiently and also making an indoor environment more comfortable by circulating internal air and receiving external air.

BRIEF DESCRIPTION OF THE DRAWINGS

Embodiments will be described in detail with reference to the following drawings in which like reference numerals refer to like elements and wherein.

DETAILED DESCRIPTION

The merits and characteristics of the present invention and a method for achieving the merits and characteristics will become more apparent from embodiments described in detail later in conjunction with the accompanying drawings. However, the present invention is not limited to the disclosed embodiments, but may be implemented in various different ways. The embodiments are provided to only complete the disclosure of the present invention and to allow those skilled in the art to understand the category of the present invention. The present invention is defined by the category of the claims. The same reference numbers will be used to refer to the same or similar parts throughout the drawings.

Hereinafter, embodiments of the present invention are described in detail with reference to the accompanying drawings.

Figure 1:
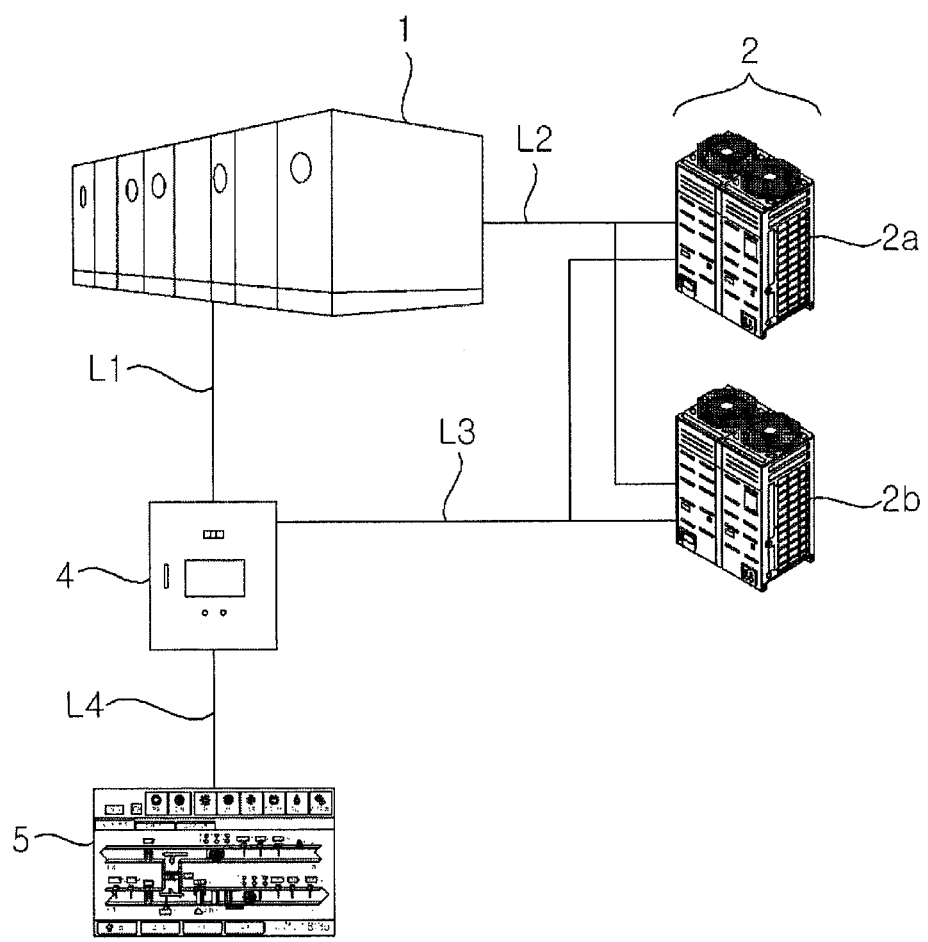
FIGS. 1, 2 and 3 are diagrams illustrating the configuration of an air conditioning system in accordance with an embodiment of the present invention.
Figure 2:
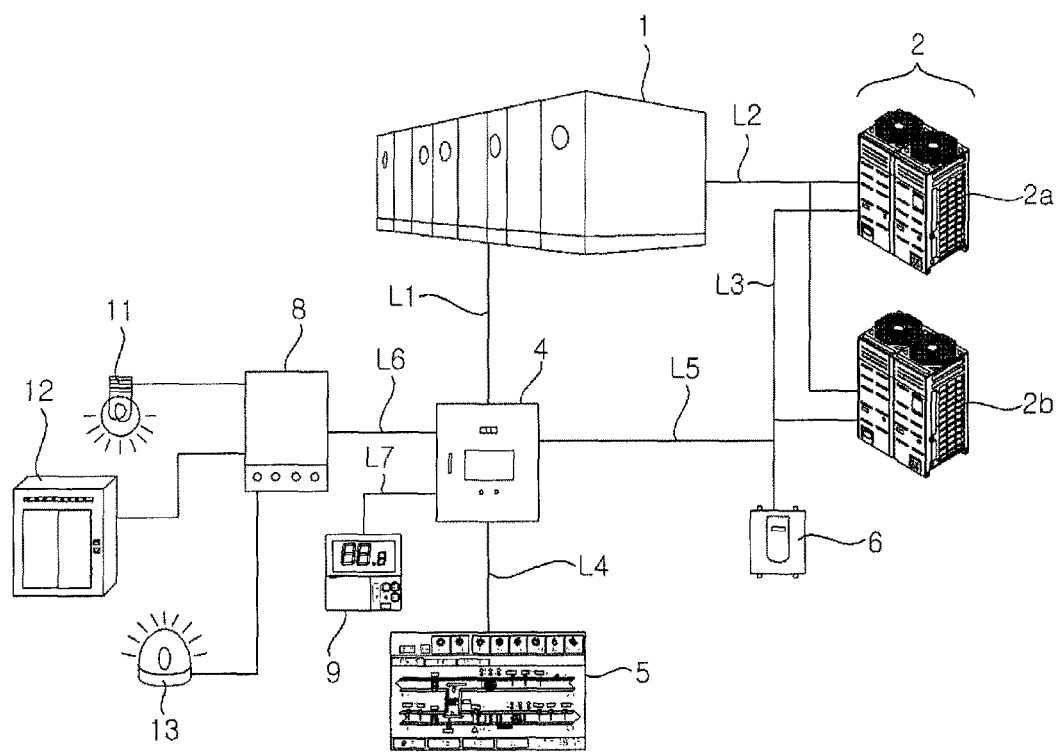
Figure 3:
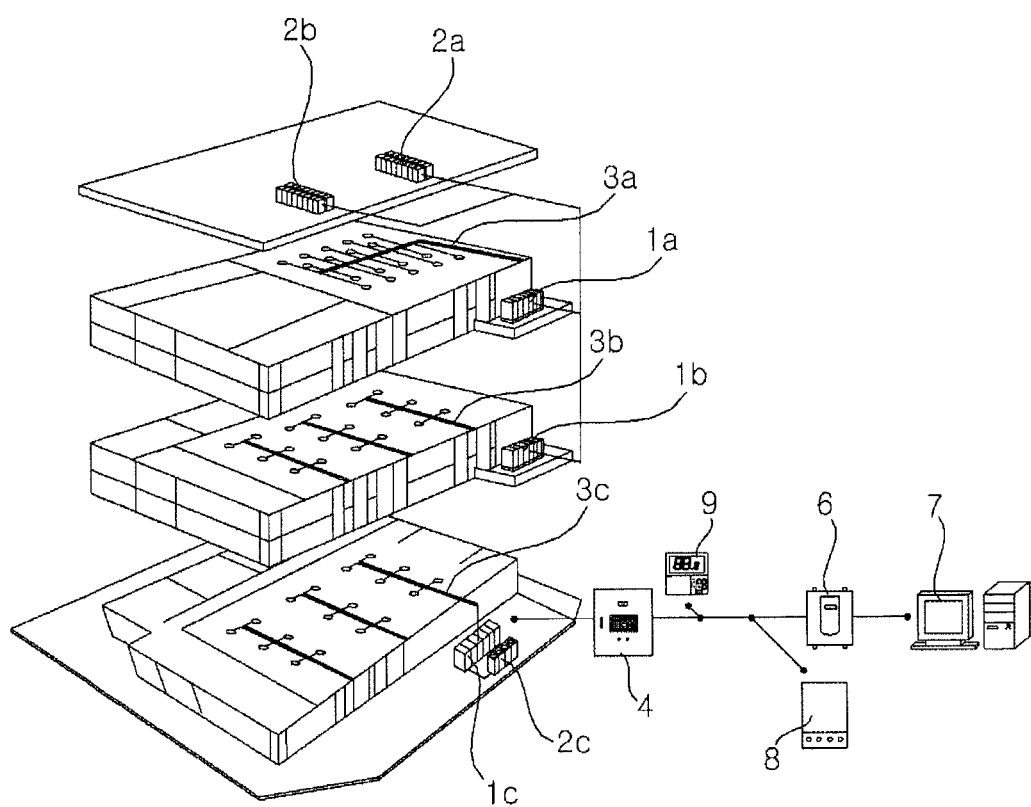

FIGS. 1, 2 and 3 are diagrams illustrating the configuration of an air conditioning system in accordance with an embodiment of the present invention. As illustrated in FIG. 1, the air conditioning system includes an air handling unit (AHU) 1, an outdoor unit 2, a controller 4, and an interface unit 5 connected to the controller 4.

The AHU 1 controls the amount of supply air that is supplied indoors, return air that is circulated and then returned back, outdoor air received from the outside, and exhaust air discharged to the outside and supplies supply air subjected to a heat exchange to the interior of a room.

The outdoor unit 2 operates in cooling mode or heating mode depending on setting and supplies a refrigerant to the AHU 1. In this case, the outdoor unit 2 provides a heat source for the thermal exchange of air in the AHU 1, and another heat source may be used in addition to the outdoor unit. For example, a heat source may be supplied through a heat pump or a geothermal plate.

The outdoor unit 2 includes at least one compressor (not illustrated) configured to compress an introduced refrigerant and discharge a high-pressure gaseous refrigerant, an accumulator (not illustrated) configured to separate a refrigerant into a gaseous refrigerant and a liquid refrigerant so that a liquid refrigerant not gasified is prevented from being introduced into the compressor, an oil separator (not illustrated) configured to recover oil from a refrigerant discharged by the compressor, an outdoor heat exchanger (not illustrated) configured to condense or evaporate a refrigerant through a heat exchange with outdoor air, an outdoor unit fan (not illustrated) configured to introduce air into the outdoor heat exchanger and externally discharge air subjected to a heat exchange in order to further smooth the heat exchange of the outdoor heat exchanger, a four-way valve (not illustrated) configured to change the flow channel of a refrigerant depending on operation mode of the outdoor unit, at least one pressure sensor (not illustrated) configured to measure pressure, at least one temperature sensor (not illustrated) configured to measure a temperature, and a control element configured to control the operation of the outdoor unit and perform communication with other units. The outdoor unit further includes a plurality of sensors, valves, and an over-cooling device, and a description thereof is omitted.

The controller 4 controls the driving of the AHU 1 and the degree of circulated air and performs control so that air is supplied at a set temperature. Furthermore, the controller 4 sets a target temperature in the outdoor unit through communication with the outdoor unit 2 or control the driving of the outdoor unit. The controller 4 further drives the outdoor unit depending on the degree of a load or stops part of the outdoor unit that is being driven. The controller 4 is installed in a surface on any one side of a housing of the AHU 1.

The interface unit 5 is connected to the controller 4, and operates as the input unit and output unit of the controller. In this case, the interface unit 5 displays the operating state of the AHU and outdoor unit based on the data of the controller 4, provides control menus for the AHU and the outdoor unit, and sends data received through the control menus to the controller 4. The interface unit 5 displays a graphic-based monitoring screen so that a user easily checks the operating state of the AHU and outdoor unit. The interface unit 5 generates a report on the operation state of the AHU and the outdoor unit for each specific time, and outputs the report.

Furthermore, as illustrated in FIG. 2, the air conditioning system is connected to the outdoor unit 2 in addition to the AHU 1, the outdoor unit 2, the controller 4, and the interface unit 5. The air conditioning system further includes a second controller 6 configured to control the outdoor unit, a local controller 9 installed in a room to which air supplied by the AHU 1 is discharged, movement means 12 within a building, a light apparatus 11, a security apparatus 13, and a building controller 8 configured to control an alarm apparatus.

The local controller 9 displays a temperature of each room and information about the operation of an AHU that is now operating, receives a user command through input means included therein, and sends the user command to the controller 4.

The second controller 6 is the central controller of outdoor units connected to the outdoor unit 2 and configured to integrally control the plurality of outdoor units. The second controller 6 controls the operation of the outdoor units, collects information about the operations of the outdoor units, and stores the collected information. The second controller 6 controls the plurality of outdoor units depending on the setting of the controller 4 so that they operate and sends data regarding the operating state of the outdoor units to the controller 4. The second controller 6 may set the operation schedules of the outdoor units in addition to the operations of the outdoor units and performs peak control based on the amount of energy consumed by the outdoor units. If the second controller 6 is not connected as in FIG. 1, the controller 4 communicates with the outdoor units and sends a control command to each of the outdoor units. The outdoor unit sets operation mode and a target temperature in response to a control command and operates.

If input/output means are not included in the second controller, the third controller 7 may be used as means for remotely connecting to the second controller, monitoring data, and inputting a control command.

The building controller 8 controls warning within a building or the security apparatus 13, controls the operation of the movement means 12, such as an elevator or escalator, and controls the light apparatus 11. Specific conversion means is included in the building controller 8 and the controller 4. The specific conversion means mutually converts data using different communication methods or communication standards and performs communication.

For example, when a fire is generated, the building controller 8 drives an alarm unit so that warning is output and simultaneously inputs a fire signal to the controller 4. After receiving the fire signal, the controller 4 stops the operation of a heat source, such as the outdoor unit, and controls a damper so that smoke is externally discharged. Furthermore, when the on/off state of a light is sent to the controller 4, the controller 4 determines whether a person is present in each room or whether a corresponding room is used and may stop temperature control by controlling air supplied to the corresponding room.

As illustrated in FIG. 3, the air conditioning system may include a plurality of the AHU 1 1a to 1c depending on the size and scale of a building. Furthermore, the air conditioning system may include a plurality of heat sources including outdoor units 2 2a to 2c in accordance with the plurality of AHU 1 1a to 1c. The outdoor unit 2 corresponding to the capacity of the AHUs is connected to the AHU 1. In this case, the number of fans included in the AHU may be changed, if necessary. The fans are modulated and configured to be assembled so that they can be easily added or removed. A total amount of circulated air is varied by changing the number of fans.

The AHU 1 is connected to a duct 3(3a to 3c), and discharges air subjected to a heat exchange to the interior of a room. An indoor temperature in each room may be measured by a sensor installed in each room or the local controller 9. Control means for controlling the direction of discharged air or the amount of wind may be included at the end of the duct 3, that is, an outlet for discharging air to the interior of a room.

The second controller 6, the third controller 7 connected to the second controller 6, and the building controller 8 operate in conjunction with each other. The controller 4 sends and receives data to and from the second and the third controllers 6, 7 and the building controller 8 and outputs corresponding information through the interface unit 5. Furthermore, if the building controller 8 and the second controller 6 are connected and operate in conjunction with each other, data received through the interface unit 5 is sent to the second controller 6 or the building controller 8 through the controller 4 so that a corresponding operation is performed.

Figure 4:
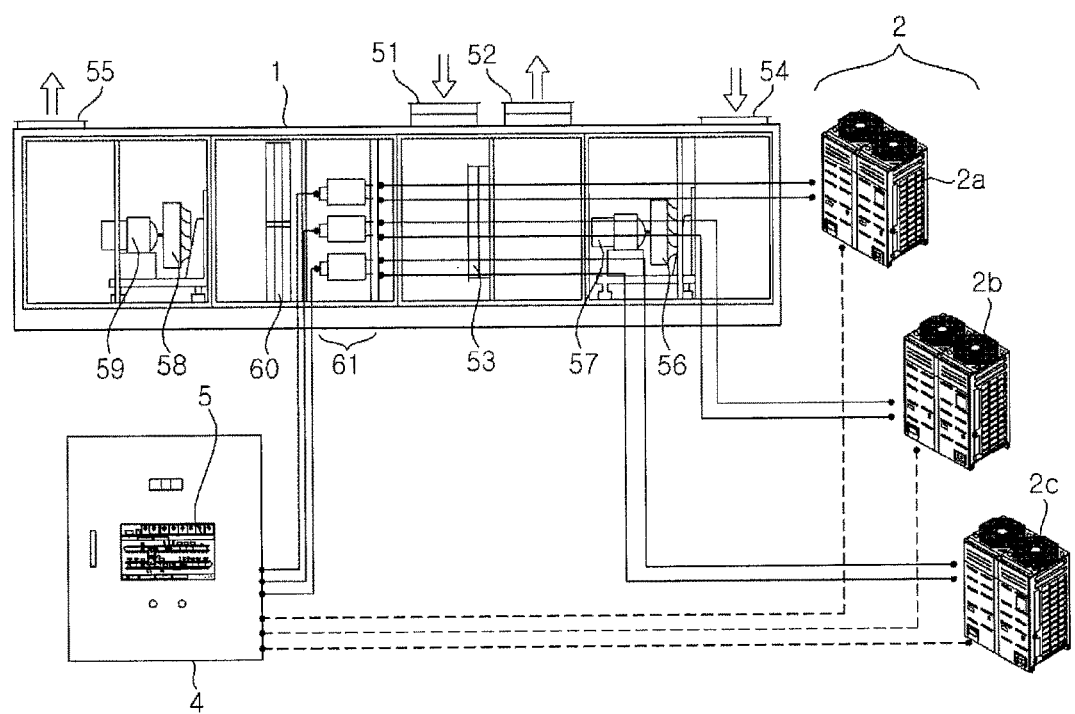
FIG. 4 is a diagram illustrating the configuration of the AHU of the air conditioning system in accordance with an embodiment of the present invention.

FIG. 4 is a diagram illustrating the configuration of the AHU of the air conditioning system in accordance with an embodiment of the present invention. As illustrated in FIG. 4, the AHU 1 may be divided as follows.

The AHU 1 includes a supply air unit configured to supply air to the interior of a room through the duct 3, a return air unit configured to circular and return air indoors, an exhaust air unit configured to discharge air to the outside, an outdoor air unit configured to suck external air, and a heat exchange unit configured to perform a heat exchange on the mixed air of outdoor air or return air and outdoor air. In this case, the units are modulated so that they can be added or removed. Furthermore, the exhaust air unit and the outdoor air unit may be integrated into a single module to form a mixing air unit.

The return air unit is equipped with a fan 56 for sucking return air that is returned back. The supply air unit is equipped with a fan 58 configured to supply outdoor air or mixed air to the interior of a room through the duct. In this case, the fans 56, 58 respectively included in the return air unit and the supply air unit are connected to respective fan motors 57, 59 and rotated in response to a control command from the controller 4. Accordingly, air flows. Each of the fan motors 57, 59 included in the return air unit and the supply air unit is an inverter motor that operates according to a set frequency. The fan motor turns on/off each fan and also controls the rotation speed of the fan. Each of the return air unit and the outdoor air unit may be equipped with 1 to 6 fans. The fans may independently operate. In this case, the fans may be modulated as described above so that they can be easily added, separated, and removed.

The fan motor included in each of the return air unit and the supply air unit is driven by a driving unit (not illustrated). The controller 4 applies a control command to the driving unit. The driving unit controls the fan motor in response to the control command so that the fan is rotated.

The outdoor air unit is equipped with a first damper 51 configured to control the degree of external air that is introduced. Furthermore, the exhaust air unit is equipped with a second damper 52 configured to discharge some of or the entire return air that is circulated and then returned back. The amount of externally discharged air is determined by the open angle of the damper. Furthermore, a third damper 53 is provided between the outdoor air unit and the exhaust air unit, and performs control so that some of or the entire return air is supplied as supply air. The controller 4 controls the opening angle of each of the first to the third dampers 51 to 53.

The third damper 53 and the first and the second dampers 51, 52 between the outdoor air unit and the exhaust air unit are opened or closed through a mutual cooperation. In this case, as the fans included in the return air unit and the supply air unit are rotated, air flows, and the flow channel of air is determined by the degree of opening/shutting of the damper. Accordingly, exhaust air and outdoor air are controlled by pressure within the AHU.

For example, if the third damper 53 is open about 67 degrees so that 70% of return air is supplied as supply, the second damper 52 of the exhaust air unit is open 23 degrees, and thus return air of 30% is externally discharged. In this case, the first damper 51 is open 23 degrees, and thus outdoor air is supplied. If 70% of return air is supplied as supply air and 30% thereof is externally discharged as exhaust air, outdoor air of 30% corresponding to the discharged air is supplied by internal pressure. Accordingly, the supply air becomes mixed air including the return air of 70% and the outdoor air of 30%.

Furthermore, if the third damper 53 is closed, the second damper 52 is open 90 degrees, and the first damper 51 is open 90 degrees, return air is externally discharged as the entire exhaust air, and outdoor air of 100% is supplied to the interior of a room. Hereinafter, outdoor air supplied as supply air of 100% is called full outdoor air.

If the AHU 1 does not include the return air unit and includes the outdoor air/exhaust air units, the heat exchange unit, and the supply air unit, only outdoor air operates as full outdoor air that is supplied as supply air without return air that is circulated and returned back.

Full outdoor air or mixed air is subject to a heat exchange through the heat exchange unit and supplied to the interior of a room as cold air through the supply air unit. The heat exchange unit is equipped with a heat exchanger 60 and an expansion valve 61. The controller 4 sets a target temperature in the outdoor unit 2 2a to 2c and controls the expansion valve so that full outdoor air or mixed air has a specific temperature based on the set target temperature. A refrigerant supplied by the outdoor unit 2 is introduced into the heat exchanger through the expansion valve. Accordingly, full outdoor air or mixed air that passes through the heat exchanger is subject to a heat exchange, thus becoming air of a specific temperature. In this case, the heat exchanger may have a water cooling type, an air cooling type, or a type in which the two types are combined.

The controller 4 may control a temperature of supply air supplied to the supply air unit to an indoor temperature depending on any one of a supply air method or a return air method or may control a temperature using a temperature of return air that is circulated and returned back as an indoor temperature. That is, in the supply air method, supply air is supplied so that a temperature of the supply air is a target temperature. In the return air method, temperature control according to a target temperature is performed based on a temperature of return air.

In this case, the interface unit 5 inputs data to the controller 4 and outputs the operating state of the AHU 1 and the flow of air to a monitoring screen based on the data stored in the controller 4.

Figure 5:
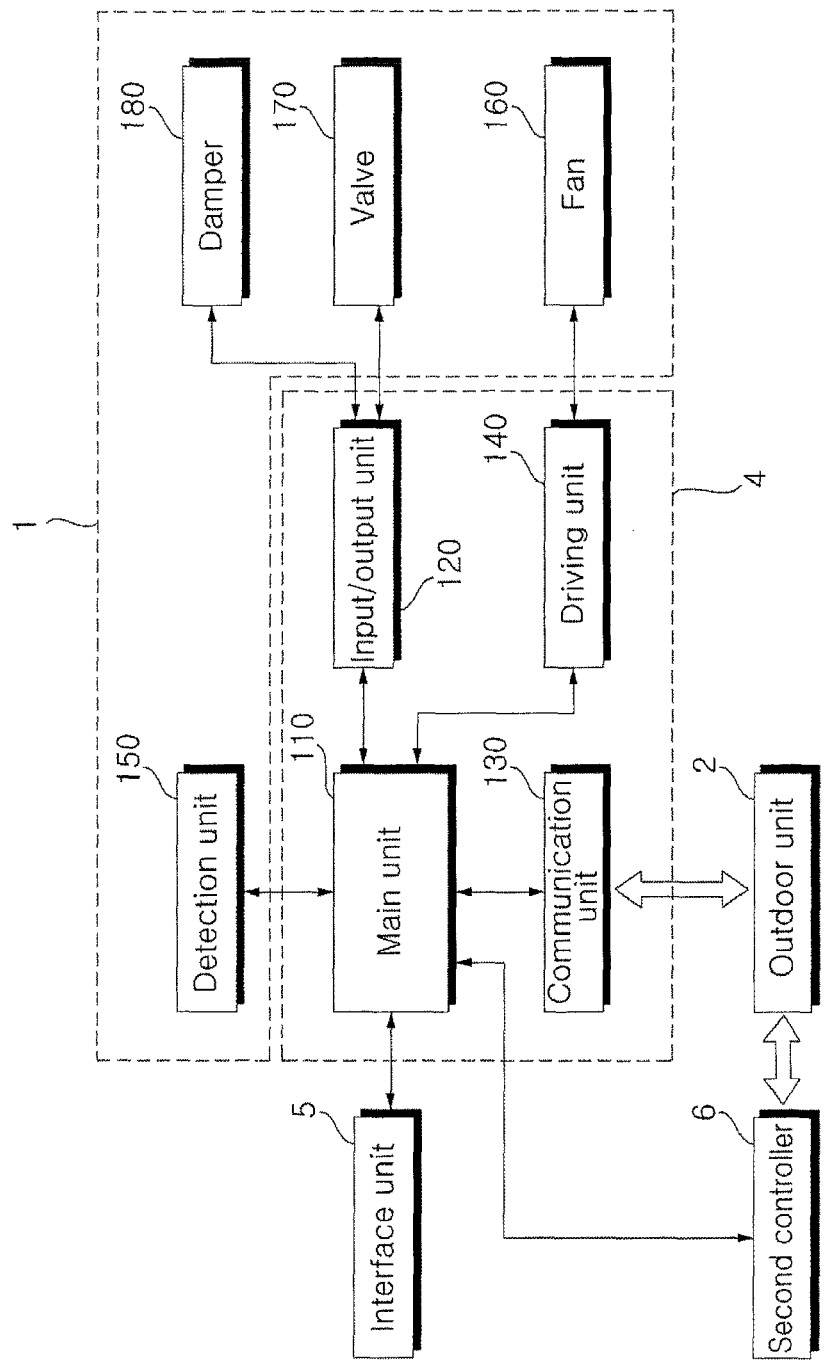
FIG. 5 is a block diagram illustrating the control elements of the air conditioning system in accordance with an embodiment of the present invention.

FIG. 5 is a block diagram illustrating the control elements of the air conditioning system in accordance with an embodiment of the present invention. As illustrated in FIG. 5, the operation of the air conditioning system is controlled by the controller 4. The air conditioning system may further include the second controller 6 or the third controller 7 for integrally controlling the outdoor unit in addition to the controller 4. The building controller 8 is connected to the second controller 6 or the third controller 7, which operate in conjunction with each other.

The controller 4 includes a main unit 110, an input/output unit 120, a driving unit 140, and a communication unit 130.

Furthermore, the controller 4 is connected to the interface unit 5, and communicates with the interface unit 5. Accordingly, the interface unit 5 operates as the input/output device of the controller 40. The interface unit 5 is configured to be attached to or detached from the controller 4.

The input/output unit 120 is connected to the AHU 1. The input/output unit 120 transfers a control signal for controlling each of elements included in the AHU 1 and inputs information about the state of each element of the AHU 1 to the main unit 110.

The input/output unit 120 is equipped with a plurality of data ports, and the data ports are connected to the AHU.

In particular, the input/output unit 120 is connected to the damper 180 and valve 170 of the AHU 1. The input/output unit 120 transfers the control signal of the main unit 110 to the damper 180 and the valve 170 and inputs data regarding the operating state of the damper 180 and the valve 170 to the main unit 110.

The driving unit 140 controls the fan 160 of the AHU 1. The driving unit 140 includes an inverter and an inverter driver and controls a fan motor so that a fan is rotated. The driving unit 140 may be installed within the controller 4, may be installed outside the controller 4, or may be separately installed near the fan according to circumstances.

The communication unit 130 sends and receives data to and from the controller 4 and outside devices. The communication module 130 includes a plurality of wired or wireless communication modules, communicates with devices connected thereto through the plurality of wired or wireless communication modules, connects to an external server (not illustrated) or a remote terminal (not illustrated) through Internet connection, and sends and receives data to and from the external server or the remove terminal.

The main unit 110 controls an overall operation of the AHU 1. The main unit 110 receives data from the outdoor unit 2 and sends data to the outdoor unit 2 through the communication unit 130. The main unit 110 controls the AHU 1 depending on the operating state of the outdoor unit 2.

Furthermore, the main unit 110 sends a control signal through the input/output unit 120 and receives data regarding the damper 180 and the valve 170.

The main unit 110 includes a plurality of input/output terminals separately from the input/output unit 120 and receives data from a detection unit 150, that is, a plurality of sensors included in the AHU 1. Furthermore, the main unit 110 is directly connected to the interface unit 5 and also connected to the second controller 6 or the building controller 8.

In this case, the second controller 6 or the building controller 8 may perform communication through the communication unit 130 in accordance with a communication method.

Furthermore, the main unit 110 includes memory for storing data. The memory stores data according to an operation of the main unit 110, data for the transmission and reception of data to and from the input/output unit 120, the driving unit 140, and the communication unit 130, data transmitted and received through the input/output unit 120 and the detection unit 150, data transmitted and received through the communication unit 130, control data for controlling the AHU 1, and data for the setting of the operation of the AHU.

The memory may include one or more magnetic disk storage devices, flash memory devices, or non-volatile memory, such as non-volatile solid-state memory devices, but is not limited thereto. For example, the memory may include a readable storage medium.

The main unit 110 determines the operating state of the AHU 1 based on data received through the detection unit 150 and the input/output unit 120 and controls the operation of the AHU 1 based on the received data. The main unit 110 generates control signals and controls the damper 180, valve 170, and fan 160 of the AHU 1 by applies the control signals to the input/output unit 120 and the driving unit 140.

Furthermore, the main unit 110 sets the operation of the AHU 1 based on data received from the interface unit 5 and sends data regarding the operating state of the AHU 1 or the outdoor unit 2 to the interface unit 5 so that the data is output.

The main unit 110 is equipped with a specific display and at least one button separately from the interface unit 5. An input for basic setting for the main unit or each of the units within the controller 4 is possible through the button, and brief information is displayed through the display. If the interface unit 5 is detachably connected to the controller 4, data may be inputted through the display and the button, but data according to control setting may be basically received through the interface unit 5.

Figure 6:
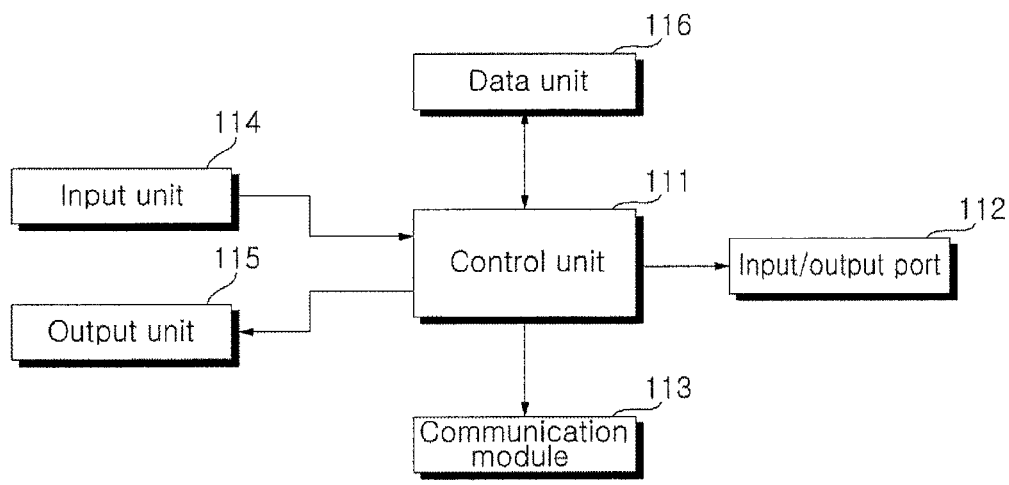
FIG. 6 is a block diagram illustrating the configuration of the interface unit of the air conditioning system in accordance with an embodiment of the present invention.

FIG. 6 is a block diagram illustrating the configuration of the interface unit of the air conditioning system in accordance with an embodiment of the present invention. As illustrated in FIG. 6, the interface unit 5 includes an input unit 114, an output unit 115, a data unit 116, a communication module 113, an input/output port 112, and a control unit 111 configured to control an overall operation of the interface unit 5.

The communication module 113 is responsible for the transmission and reception of data between the main unit 110 and the interface unit 5. The communication module 113 is connected to the main unit 110 through a communication line.

The communication module 113 performs communication using a serial communication method, such as RS485 communication, for example. As described above, the main unit 110, the input/output unit 120, the driving unit 140, and the communication unit 130 also send and receive data each other using a serial communication method.

The communication module 113 may further include wireless communication means, such as a short-distance communication module for communication with an external terminal (not illustrated).

The input/output port 112 includes a terminal on which external memory is mounted and may further include a connection terminal that may be connected to external devices through a cable.

The input unit 114 includes at least one button or switch and specific input means, such as a touch pad. When the input means is manipulated, the input unit 114 generates a specific key input signal and inputs it to the control unit 111.

For example, the input unit 114 may include a button, a switch, a keypad, a dome switch, a touch input unit (capacitive/resistive), and/or a jog wheel. In particular, if the input unit 114 forms a mutual layer structure along with the display means of the output unit 115, this may be called a touch screen.

The output unit 115 includes the display means for outputting alphabetical and numerical letters, special characters, and images, a speaker or buzzer for generating specific sound effects or alarms, and at least one lamp for indicating whether various states will be emitted, colors, and flickering state.

The output unit 115 implements data received from the controller 4 in the form of a graphic-based monitoring screen and outputs the data to the display means. When the input means of the input unit 114 is manipulated, the output unit 115 outputs a corresponding menu screen.

The data unit 116 stores data for outputting the monitoring screens of the AHU and the outdoor unit, data for setting the operation of the AHU, and data received from the controller 4 and also stores data that is received through the input unit 114 and that is to be sent to the controller 4.

The control unit 111 processes input/outputted data, controls the transmission and reception of data through the communication module 113 and the input/output port 112, generates a control signal according to the key input signal of the input unit 115, sends the control signal to the controller 4, and performs control so that a screen corresponding to an input signal is output through the output unit 115.

Furthermore, the control unit 111 analyzes data received from the controller 4 so that the operation state of the AHU 1 and the outdoor unit is displayed in the form of a monitoring screen through the output unit 115. In this case, the control unit 111 performs control so that the monitoring screen is changed and displayed in real time in response to received data and performs control so that a menu screen corresponding to a key input signal is displayed.

The control unit 111 monitors the connection state with the controller 4 connected thereto through the communication module 113 and outputs warning through the output unit 115 when the connection of the controller 4 is released.

Figure 7:
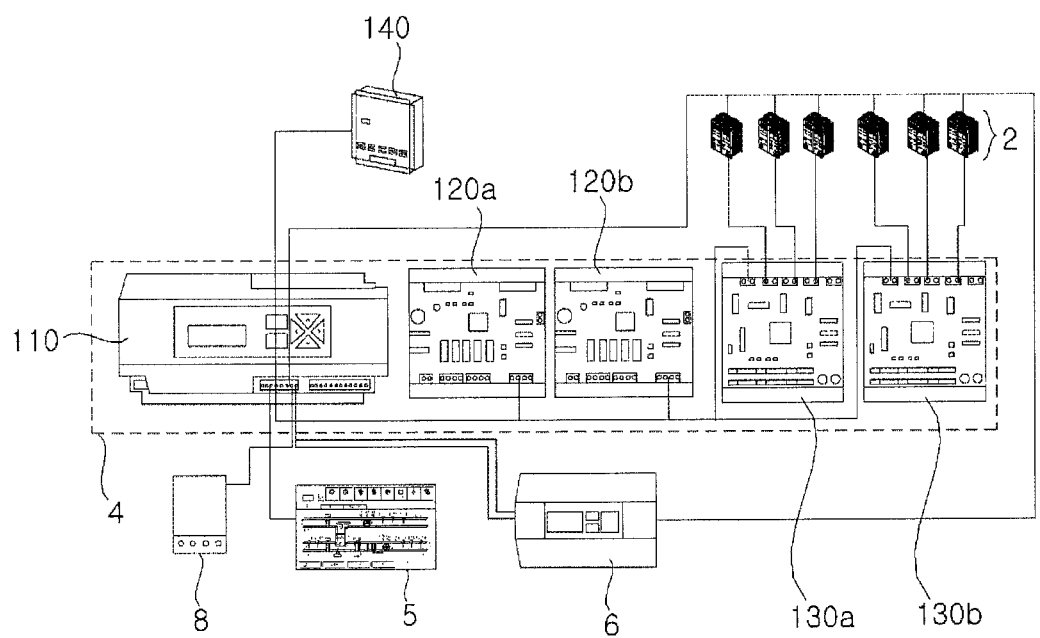
FIG. 7 is a diagram illustrating a plurality of modulated units that form the controller and the air conditioning system connected to the modules in accordance with an embodiment of the present invention.

FIG. 7 is a diagram illustrating a plurality of modulated units that form the controller and the air conditioning system connected to the modules in accordance with an embodiment of the present invention.

As illustrated in FIG. 7, the units forming the controller 4 are modulated and interconnected.

The main unit 110, input/output unit 120, driving unit 140, and communication unit 130 of the controller 4 and the interface unit 5 are interconnected through communication lines, and they sends and receives data each other. For example, data may be transmitted and received using a serial communication method, such as RS485, in accordance with the communication standard of the air conditioning system.

In this case, each of the units of the controller 4 is equipped with a communication module for internally sending and receiving data each other separately from the communication unit 130.

In this case, the units of the controller 4 is added or removed for each module.

For example, if the configuration of the AHU 1 is changed, the input/output unit 120, the driving unit 140, and the communication unit 130 may be added to the controller 4, or some of the input/output unit 120, the driving unit 140, and the communication unit 130 may be removed from the controller 4. That is, if a fan is additionally installed to the AHU 1, a driving unit for driving the fan is additionally installed depending on the number of added fans, and the added driving unit is connected to the main unit 110 through a communication line.

Accordingly, the controller 4 includes the main unit 110, a first input/output unit 120a, a second input/output unit 120b, a first communication unit 130a, a second communication unit 130b, and the driving unit 140. In some embodiments, the driving unit 140 may be separated from the controller 4 and installed near the AHU.

The communication unit 130 may be added depending on the number of connected outdoor units 2, and thus the communication unit 130 may include the first communication unit 130a and the second communication unit 130b. The communication unit 130 performs the transmission and reception of data to and from each of the connected outdoor units. If the number of connected outdoor units is increased, the third communication unit 130 may be additionally installed.

Furthermore, the input/output unit 120 may be additionally installed depending on the number of devices installed in the AHU, and thus may include the first input/output unit 120a and the second input/output unit 120b.

As described above, data that is transmitted and received or inputted and output is transmitted to the main unit 110 through an internally connected communication line.

Furthermore, the interface unit 5, the second controller 6 connected to the outdoor unit 2, and the building controller 8 connected to the movement means and the light apparatus are directly connected to the main unit 110.

The interface unit 5 is connected to the main unit 110 through a communication line, and communicates with the input/output unit 120 and the communication unit 130 using the same serial communication method.

The main unit 110 may send and receive data to and from the second controller 6 and the building controller 8 using a communication method that is the same as or different from a communication method within the controller 4 in accordance with the communication method of each controller.

Figure 8:
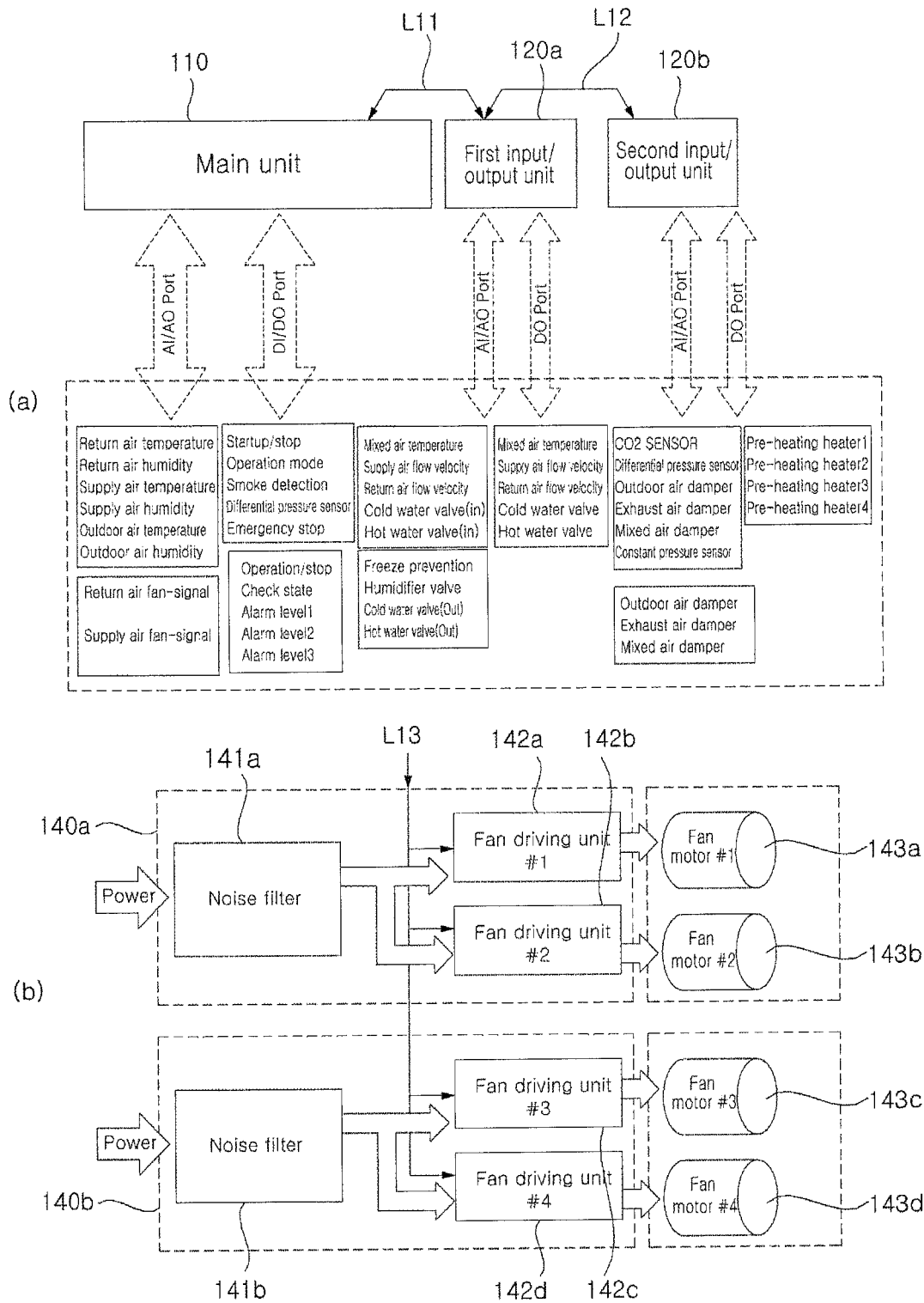
FIG. 8 is a diagram illustrating the flow of a signal for each unit in the controller in accordance with an embodiment of the present invention.

FIG. 8 is a diagram illustrating the flow of a signal for each unit in the controller in accordance with an embodiment of the present invention.

As illustrated in FIG. 8(a), the main unit 110 is connected to the detection unit 150 of the AHU 1, that is, a plurality of sensors, through an input/output terminal, and receives data measured by the AHU 1.

In this case, the main unit 110 includes both an analog input/output terminal and a digital input/output terminal. The main unit 110 receives the measured value of a temperature and humidity from each of the sensors, data regarding start-up in related to the operation state of the AHU 1, operation mode, and the detection of smoke, the measured value of a differential pressure sensor, and data regarding whether emergency has occurred.

The main unit 110 receives a return air temperature, return air humidity, a supply air temperature, supply air humidity, an outdoor air temperature, and outdoor air humidity through the analog input/output terminal. In this case, if a humidity sensor is not installed, a humidity value is not received. The main unit 110 receives the fan signals of a return air fan and a supply air fan.

Furthermore, the main unit 110 receives data regarding start-up or stop, operation mode, and the detection of smoke, the data of a differential pressure sensor, and a signal regarding an emergency stop through the digital input/output terminal and also receives data for checking the state and a signal regarding the grade of an alarm.

The input/output unit 120 receives data regarding a temperature, a flow velocity, a valve, a damper, and a heater from each of the first and the second input/output units 120a, 120b and sends the data to the main unit 110.

The first input/output unit 120a receives a temperature of mixed air, a supply air flow velocity, a return air flow velocity, the input/output pressure of a hot water valve and a cold water valve, data according to the opening/shutting of a valve, data regarding whether freeze prevention has been set, and data regarding a humidifier valve.

The second input/output unit 120b receives data measured by a carbon dioxide ($CO_2$) sensor, a differential pressure sensor, and a constant pressure sensor, data regarding the open angle of the first damper 51 that is an outdoor air damper, the second damper 52 that is an exhaust air damper, and the third damper 3 that is a mixed damper and also receives data from a preheating heater.

In this case, whether data will be input is changed depending on whether a humidifier and the preheating heater are installed in the AHU 1. If other devices are installed, the data of the installed devices may be received through the input/output unit 120.

As illustrated in FIG. 8(b), the driving unit 140 may be additionally installed depending on the number of fans installed in the AHU 1, and controls the fans associated with the first driving unit 140a and the second driving unit 140b. The first and the second driving units 140a, 140b are connected to the main unit 110 through a communication line L13, and communicate with the main unit 110.

The driving unit 140 includes noise filters 141a, 141b for filtering supplied power and includes fan driving units 142a to 142d for receiving filtered power and driving fan motors 143a to 143d.

The first to the fourth fan driving units 142a to 142d are respectively connected to the first to the fourth fan motors 143a to 143d, and control the fan motors 143a to 143d, that is, inverter motors. Each of the fan driving units includes an inverter and an inverter driver. Accordingly, the fans may independently operate depending on different setting. In this case, each fan may operate at different rotation speed in response to the control command of a fan driving unit connected thereto.

Two fan driving units are connected to each of the noise filters. The fan motors are connected to the respective fan driving units. Since two fans are connected to each of the driving units, fans may be added to or removed from the AHU 1 every two fans. Furthermore, since two fans are connected to a driving unit, and they operate depending on different setting, the operation of an abnormal fan is stopped and the remaining fan normally operates if abnormality occurs in one of the fans. In this case, the abnormal fan may be rotated according to an air current due to the influence of the normal fan. Accordingly, when an error occurs, the driving unit 140 prevents the abnormal fan from rotating through electrical or physical locking.

Figure 9:
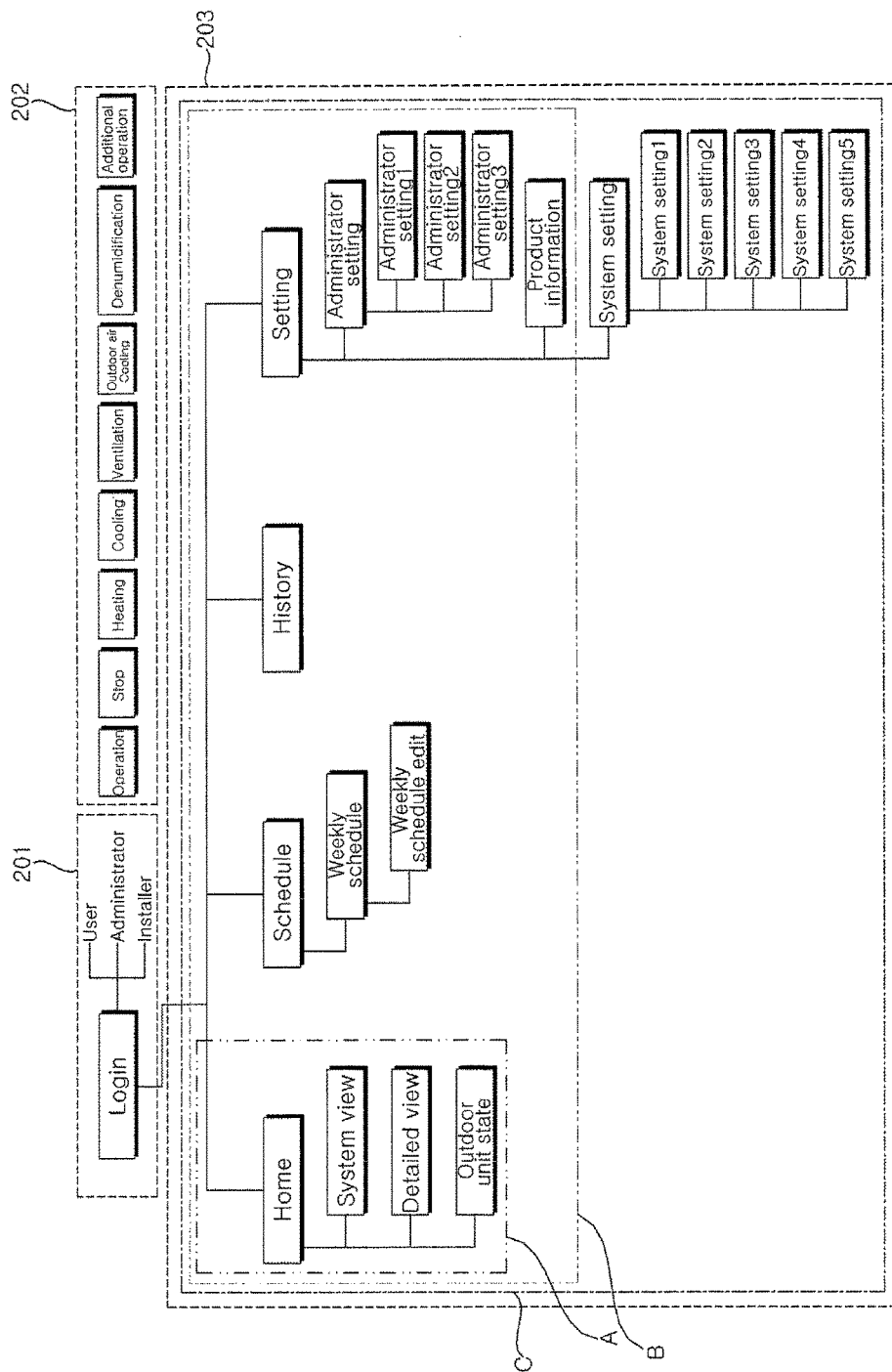
FIG. 9 is a diagram illustrating the menu structure of an interface unit in accordance with an embodiment of the present invention.

FIG. 9 is a diagram illustrating the menu structure of an interface unit in accordance with an embodiment of the present invention.

As illustrated in FIG. 9, the interface unit 5 displays data received from the controller 4 on a screen of the output unit 115 and sends data received through the control menu of the AHU 1 or the outdoor unit 2 to the controller 4.

In this case, the interface unit 5 includes a plurality of menu screens in which the operating state of the AHU 1 and the outdoor unit 2 is monitored and controlled.

The interface unit 5 includes a plurality of menus for monitoring, setting and controlling of the AHU 1 and the outdoor unit 2, and displays a screen corresponding to the input of the input unit 114. The interface unit 5 provides a login menu 201, and login is possible as a user, an administrator, or an installer. In this case, the configuration of a displayed screen and provided menus are different in each of the user, administrator, and installer depending on a login right. Accordingly, the control right of the AHU 1 or the outdoor unit 2 is also differently set.

An operation menu 202 for controlling the operation of the AHU 1 is basically provided to the interface unit 5, and includes an operation (operation start), a stop (operation stop), heating, cooling, ventilation, outdoor air cooling, dehumidification, and an additional operation. When a corresponding key is selected, corresponding operation mode is set. The operation menu is one of the control menus for the AHU 1 and the outdoor unit 2.

The interface unit 5 is equipped with four main menu items, including home, schedule, and history, when login is performed.

The home menu includes the monitoring menus of the AHU 1 or the outdoor unit 2. The home menu includes submenus, including a system view, a detailed view, and an outdoor unit state as the monitoring menu. The system view provides the monitoring data of the AHU 1. The detailed view displays detailed information about the operating state of the AHU 1. The outdoor unit 2 may be monitored through the outdoor unit state.

The schedule menu is a menu item for setting the operation schedule of the AHU 1. The schedule menu includes submenus, including a weekly schedule menu. The weekly schedule menu separately includes a weekly schedule edit screen.

The history menu displays the control history or error occurrence history of another controller or unit connected to the AHU 1, the outdoor unit 2, or the controller 4.

The schedule menu and the operation menu are the control menus for the AHU 1 and the outdoor unit 2.

The setting menu is equipped with menus for inputting information about devices installed in the AHU 1 and performing tests in order to control the operation of the AHU 1. The setting menu includes submenus, including administrator setting, product information, and system setting as the control menu.

The administrator setting is a setting menu for allowing an administrator and an installer to control the AHU 1, and includes submenus including administrator setting 1, 2, 3. The product information displays information about the models and versions of the AHU 1 and the interface unit 5. Furthermore, the system setting menu provides submenus, including system setting 1 to 5, in which the basic value or basic control value of each unit actually installed in the AHU 1 can be input according to an installer's right.

Interface unit 5 displays the operation menu for all login right.

In this case, the interface unit 5 displays only the home menu (A) of the main menus upon user login according to a login right and displays monitoring information about the AHU 1 or the outdoor unit 2. When an administrator logs in the interface unit 5, the interface unit 5 displays the four main menus, including home, schedule, and history, and setting, on a screen (B). In this case, all the submenus of the four main menus are displayed, but in the setting menu, only administrator setting and product information are displayed and system setting is not displayed. Accordingly, upon administrator login, setting input for control, history, and schedule management are possible in addition to basic monitoring. Upon installer login, all the menus including the system setting of the setting menu are displayed (C), and corresponding setting is possible. When the AHU 1 is initially installed, the set values of devices installed in the AHU 1, for example, a sensor, a valve, and a damper can be input. More specifically, the detection range and sensitivity of an installed sensor can be input, and a corresponding function can be turned on/off depending on whether a carbon dioxide detection sensor has been installed. Since such setting is not changed after initial setting, it is displayed only upon installer login. If an element of the AHU is changed or a module is added, a changed element may be newly set through installer login.

Each of the menu screens is described below with reference to the accompanying drawings.

Figure 10:
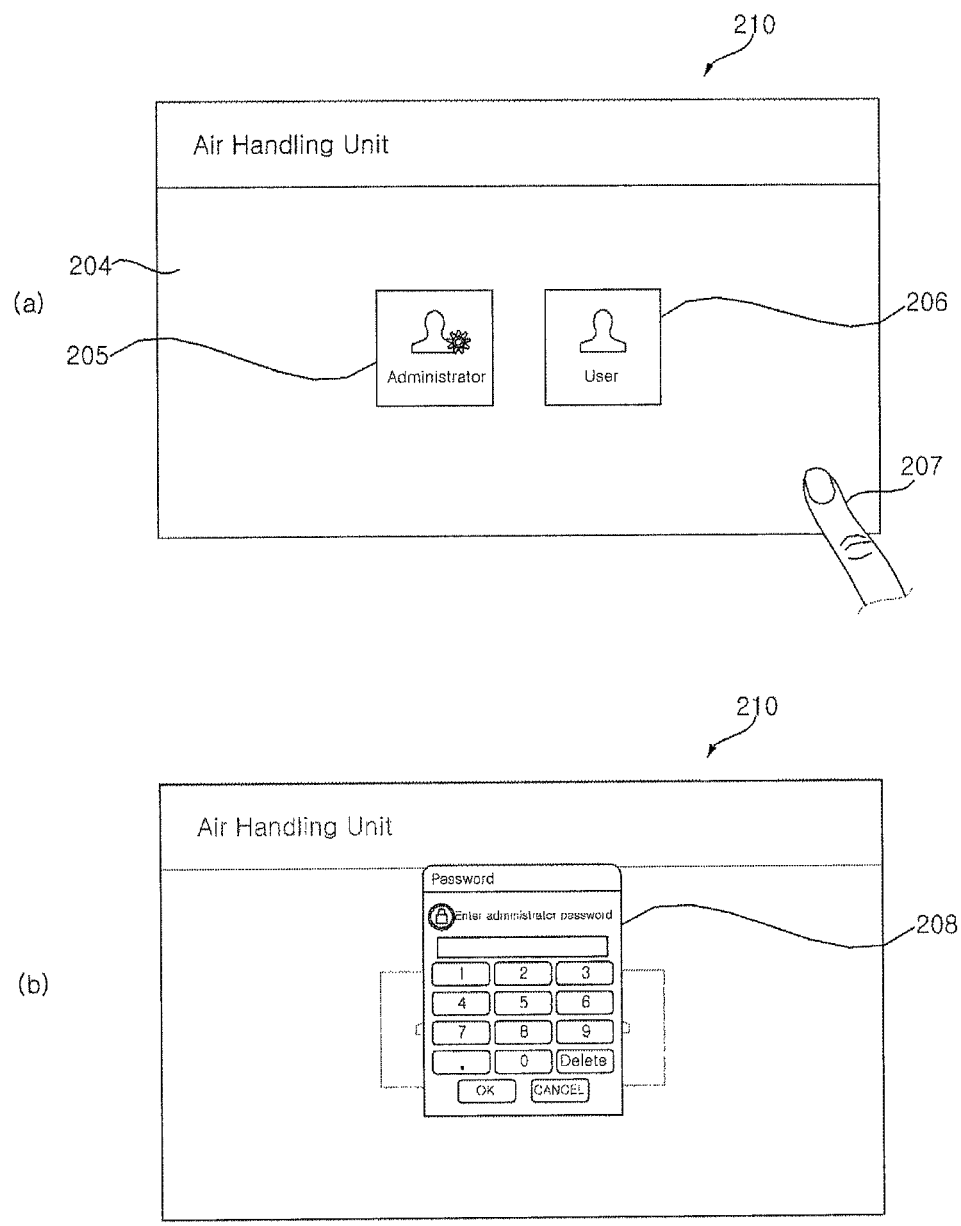
FIG. 10 is an exemplary diagram to which reference is made in order to describe the login method of the interface unit in accordance with an embodiment of the present invention.

FIG. 10 is an exemplary diagram to which reference is made in order to describe the login method of the interface unit in accordance with an embodiment of the present invention.

As illustrated in FIG. 10, a login menu 204 is displayed on a screen 210 of the output unit 115 in the interface unit 5.

Figure 11:
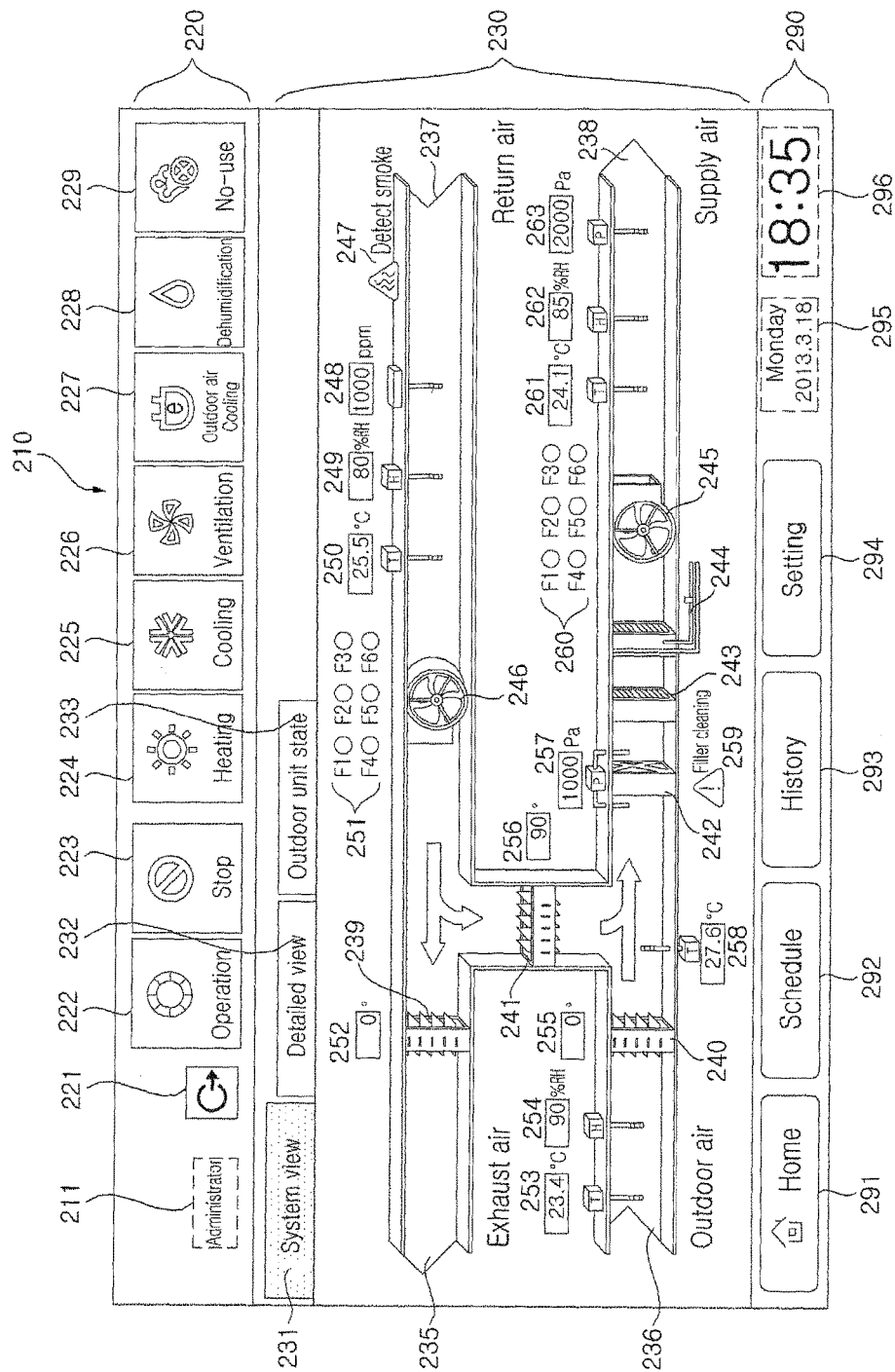
FIGS. 11 to 14 are exemplary diagrams illustrating embodiments of monitoring screens of the interface unit of the air conditioning system in accordance with an embodiment of the present invention.

As illustrated in FIG. 10(*a*), an administrator key 205 and a user key 206 are displayed in the login menu 204 depending on a login right. When any one of the keys is selected, a password input window 208 is displayed on a screen in the form of a pop-up menu, as illustrated in FIG. 10(*b*). A plurality of keys and an input box in which selected keys are displayed are displayed in the password input window 208. When an OK key is selected after entering a password, the password is compared with previously stored authentication information. If the authentication is successful, a monitoring menu of FIG. 11 is displayed on a screen. If the authentication fails, for example, if the password is not identical with the previously stored authentication information or a corresponding user has a right different from a selected right, a guide message that prompts the corresponding user to enter a password again is output along with a guide according to the mismatch. Furthermore, a separate warning message may be output.

In this case, FIG. 10(*a*) illustrates the login keys for an administrator and a user. If any specific region of the login screen 204 is selected (207) or if a specific region is touched for a specific time or more, the password input window 208 may be displayed to enable installer login as illustrated in FIG. 10(*b*).

As described above, a displayed menu is differently output depending on that login is performed by which right of an installer, an administrator, and a user, and a corresponding setting right is also changed.

FIGS. 11 to 14 are exemplary diagrams illustrating embodiments of monitoring screens of the interface unit of the air conditioning system in accordance with an embodiment of the present invention.

FIG. 11 is a diagram illustrating a monitoring screen 210 illustrating the system state of the interface unit.

Data received by the controller 4 is stored in the memory of the main unit 110 of the controller 4.

The main unit 110 sends the stored data to the interface unit 5. The interface unit 5 analyzes the data received from the controller 4 and displays the monitoring screen 210 for the AHU 1 on the output unit 115, as illustrated in FIG. 11. In this case, the interface unit 5 is equipped with a program for analyzing data and implementing the analyzed data in graphics.

The control unit 111 of the interface unit 5 analyzes data received from the controller 4 based on the data of the AHU 1, implements the graphic-based monitoring screen 210 based on information about the structure of the AHU 1, and displays the implemented graphic-based monitoring screen 210 through the output unit 115.

The control unit 111 performs control so that actually measured data values are displayed on a screen based on data, a temperature, and humidity measured by the AHU 1 and information about the state of the valve and startup state measured by the AHU 1. For example, a supply air temperature and an intake temperature may be displayed in the form of numerical values. The data value may be displayed in the form of at least one of numerical and alphabetical letters and special symbols and a combination of them.

The control unit 111 includes images or icon data corresponding to each of parts and devices installed in the AHU 1, and performs control so that a corresponding image or icon is displayed in a region corresponding to the place where a part and device of the AHU 1 are actually installed based on information about the location. Furthermore, the control unit 111 displays the flow of air on the monitoring screen 210.

The control unit 111 performs control so that the shape of a corresponding image or icon is changed and displayed based on received data. Accordingly, the operating state of each device is displayed in the form of an icon or image. For example, in the case of a fan that normally operates, an image may be displayed in a form in which the fan is rotated. In the case of a fan in which a failure has occurred, a different color may be displayed in a stopped state. For example, the fan may be displayed in black or a separate alarm may be added and displayed.

An operation menu 220 is displayed at the top of the monitoring screen 210 displayed on the output unit 115 of the interface unit 5. A main menu 290 is displayed at the bottom of the monitoring screen 210. A main screen is displayed in the middle of the monitoring screen 210. In a monitoring state, a monitoring menu 230 is displayed on the main screen. In this case, when any one of the operation menu 220 at the top and the main menu 290 at the bottom is selected, corresponding data is displayed on the main screen. In this case, a selected key in the operation menu 220 and the main menu 290 is displayed with a color different from that of another key. For example, when a home key 291 is selected and an operation 222 and heating 224 are selected, a corresponding main screen is displayed. Furthermore, the home key and the heating key are displayed with a color or letter size different from that of another key in order to provide notification that they have been selected.

Information 211 about a user who is now accessed, a power key 221, an operation key 222, a stop key 223, a heating key 224, a cooling key 225, a ventilation key 226, an outdoor air cooling key 227, a dehumidification key 228, and an additional function key 229 are displayed in the operation menu 220.

The user information 211 displays information about a user who has logged in to the interface unit 5. For example, the user may be divided into an installer, an administrator, and a user, a displayed name can be changed, and a separate ID or icon may be displayed instead of the name.

The power key 221 is a login key. If the power key 221 is selected in a login state, information about a user who is now logged in is logged out. If the power key 221 is selected in a logout state, a login menu may be displayed on the main screen at the center or a new window is created and displayed.

When the operation key 222 is selected by a key button in the operation state, the AHU 1 starts an operation. When the stop key 223 is selected, the operation of the AHU 1 in the operation state is stopped. In this case, if the AHU 1 is in the stop state, the operation key 222 is activated, and the stop key 223 is activated only when the AHU 1 is in the operation state. When the operation key 222 is selected, the control unit 111 sends a corresponding control signal to the controller 4. The controller 4 controls the AHU 1 in response to the control signal.

The heating key 224, the cooling key 225, the ventilation key 226, the outdoor air cooling key 227, and the dehumidification key 228 correspond to operation mode. The AHU 1 is set so that it operates in heating mode, cooling mode, ventilation mode, outdoor air cooling, and dehumidification mode through the heating key 224, the cooling key 225, the ventilation key 226, the outdoor air cooling key 227, and the dehumidification key 228.

For example, when the cooling key 225 is selected, the AHU 1 operates in cooling mode. In this case, the control unit 111 sends a control signal for the cooling mode setting to the controller 4. The controller 4 controls the AHU 1 so that it operates in cooling mode and also controls a heat source, that is, the outdoor unit 2, so that it is operates in cooling mode. In this case, after the control unit 111 sends a control signal in response to the selection of the cooling key 224, if the AHU 1 still remains in another operation mode, for example, ventilation mode based on data received through the controller 4, the control unit 111 displays operation mode on the main screen to be ventilation mode. If the AHU 1 switches to cooling mode, the control unit 111 displays operation mode on the main screen to be cooling mode. Furthermore, the control unit 111 may activate or deactivate a specific key in accordance with a device installed in the AHU 1 and display the specific key. For example, if temperature/humidity sensors are not included in the return air unit or the outdoor air unit, the outdoor air cooling key 227 is deactivated and becomes a state in which it cannot be selected because a cooling operation may not be performed using only outdoor air.

Furthermore, the additional function key 229 is a menu for setting the additional functions of the AHU 1, such as humidification and automatic return air. An operation for a corresponding device is set in accordance with a device installed in the AHU 1.

Contents displayed on the additional function key 229 may be changed depending on selected setting. Contents displayed on the additional function key 229 are changed in order of humidification, automatic return air, humidification, automatic return air, and no-use depending on the number of keys selected.

If a humidification function is not included in the AHU 1, that is, if a humidifier is not installed in the AHU 1, the humidification function cannot be selected. Furthermore, if a carbon dioxide sensor is not installed in the AHU 1, an automatic return air function cannot be selected because it is deactivated. Although a deactivation function is selected, contents may automatically switch to no-use because the control unit 111 is unable to set the deactivation function. Furthermore, if operation mode is selected as dehumidification or outdoor air cooling, humidification and automatic return air cannot be set.

If a humidification function is not used although it is included or if automatic return air is not performed, no-use may be set.

A home key 291, a schedule key 292, a history key 293, and a setting key 294 are displayed in the main menu 290 at the bottom. A date and day-of-the-week 295 and a time 296 are displayed on the right of the main menu 290.

The home key 291 displays a home screen on the main screen. The monitoring menu 230 of the AHU 1 and the outdoor unit 2 in the operation state is displayed as the home screen.

The schedule key 292 is used to set the operation schedule of the AHU 1. The history key 293 displays the operation history and failure history of the AHU 1. The setting key 294 displays setting menus for controlling the AHU 1 on the main screen. Furthermore, the setting key 294 displays setting menus for the operation of the interface unit 5 on the main screen. For example, setting, such as screen brightness, may be changed.

Furthermore, when the date and day-of-the-week 295 or the time 296 is selected, a menu in which the time of the system can be changed is displayed.

The main screen displays a plurality of tabs 231, 232, 233 depending on displayed data, and thus data is changed and displayed in accordance with a selected tab. The monitoring menu 230 is divided into three tabs: a system view tab 231, a detailed view tab 232, and an outdoor unit state tab 233 and displayed.

The system view tab 231 is basically selected and displayed on the main screen when the home key 291 is selected. The system view tab 231 displays the operating state of the AHU 1 in the monitoring menu 230 in real time.

The monitoring menu 230 displays the flow of air using an arrow and displays return air 237, exhaust air 235, outdoor air 236, and supply air 238 according to the intake and exhaust of air. Furthermore, the monitoring menu 230 displays each of a device, a damper, a valve, a sensor, and a filter in the form of an image or icon and displays a corresponding data value on a screen.

In this case, an image or icon of each device is displayed in a form corresponding to an actually installed device and disposed in a screen so that it corresponds to an actual location. Furthermore, in the case of a moving device, the movement of the device is displayed in such a manner that a corresponding image or icon is varied in response to the moving device. If abnormality is generated, a separate alarm is output, and an image or icon according to the generation of an error may be added and displayed on a screen or a corresponding color is changed and displayed.

Since a smoke detection sensor is provided on the part of the return air 237, a smoke detection icon 247 is displayed. Images of a concentration 248, humidity 249, and a temperature sensor 250 are displayed, and corresponding data values are indicated by 1000 ppm, 80%, and 25.5 degrees. In this case, the detection of smoke is displayed when smoke generated due to a fire is detected by the smoke detection sensor, or whether smoke has been detected is displayed by displaying a different color. A concentration sensor measures a concentration of carbon dioxide and may determine whether automatic return air will be performed based on a concentration of carbon dioxide in return air that is indoors circulated and then returned back. Accordingly, the degree of outdoor air and exhaust air can be determined.

Furthermore, a return air fan 246 is displayed, and the operating state 251 of each of the return air fans is displayed over the return air fan 246. If six return air fans 246 are included, they are indicated by F1 to F6. The state of the fan is indicated with green, white, or red in accordance with an operating state, such as an operation, stop, or error.

An exhaust air damper (second damper) 52 239 is displayed on the part of the exhaust air 235. If some of return air becomes exhaust air, the open amount 252 of a damper is displayed on the part of the exhaust air damper (second damper) 52 239. Furthermore, an outdoor air damper (first damper) 51 240 is displayed on the part of the outdoor air 236, and the open amount 255 of the outdoor air damper for controlling introduced outdoor air is displayed. A temperature 253 and humidity 254 of introduced outdoor air are displayed on the part of the outdoor air 236. A temperature and humidity sensor on the outdoor air side is installed outside the outdoor air damper, and measure an external temperature and external humidity. Accordingly, an external temperature and external humidity can be measured even in the state in which the outdoor air damper has been closed.

If the open angle of the exhaust air damper 52 239 is 0, it means that return air 100% is supplied as supply air in the state in which the exhaust air damper has been closed. In this case, the open angle of the outdoor air damper 51 240 also becomes 0 because the opening angle of the exhaust air damper operates in conjunction with the outdoor air damper (first damper) 51 240.

A mixed damper (third damper) 53 241 is displayed between the exhaust air and the outdoor air, and the open amount 256 thereof is displayed. In this case, the open amount of the mixed damper is indicated by an open angle. When the open angle is 0 degree, the mixed damper is in a closed state. When the open angle is 90 degrees, the mixed damper is in a maximum open state. The mixed damper is open at a maximum of 90 degrees because exhaust air is 0%, outdoor air is 0%, and return air is 100%.

Furthermore, a temperature sensor 258 for measuring a temperature of mixed air in which return air and outdoor air are mixed is displayed between the mixed damper 241 and the outdoor air damper 240.

In this case, heat exchangers 243, 244 installed between the outdoor air or mixed air side and the supply air side are displayed. A filter 242 for removing alien substances included in air introduced into the heat exchanger is displayed. In this case, pressure sensors are included on both sides of the filter 242, and pressure 257 of the air introduced into the heat exchanger after passing through the filter 242 is displayed.

Whether filter cleaning is required is determined based on a filter cleaning cycle or the data value of a filter differential pressure sensor mounted on the filter, and a filter icon 259 indicative of a cleaning time is displayed.

Sensors for pressure 263, humidity 262, and temperature 261 are displayed on the part of the supply air 238, and a supply air fan 245 is also displayed. Supply air fans 245 are also indicated by F1 to F6 depending on the number of installed fans, and each indicates the operating state of each fan.

The fan and the damper displayed in the monitoring menu 230 may be displayed in the form of images that move according to the operation state, and whether each sensor normally operates is indicated based on a color or displayed data value. Furthermore, a warning icon may be displayed.

Figure 12:
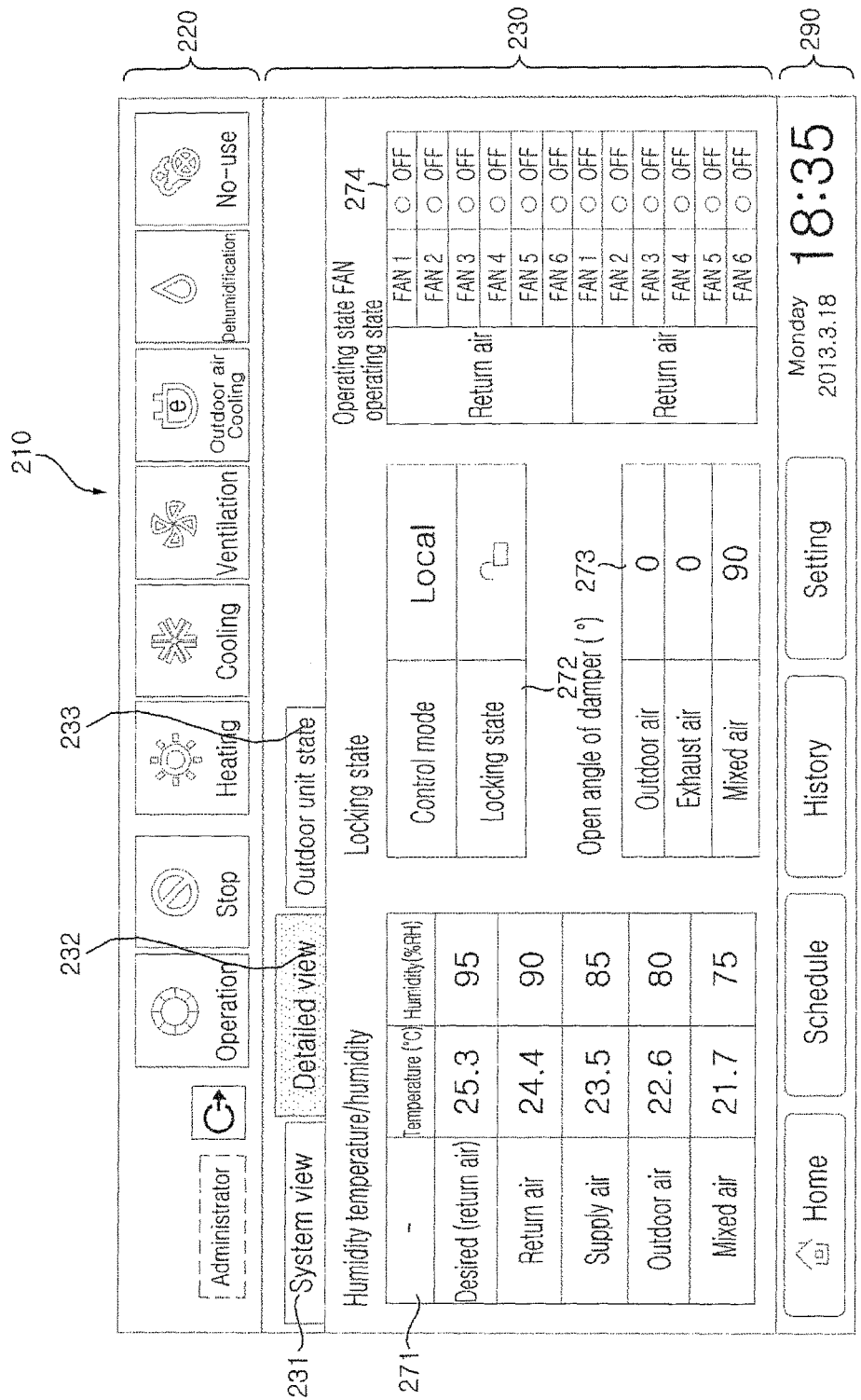

FIG. 12 is an exemplary diagram in which detailed information of the monitoring menu displayed on the interface unit is displayed. As illustrated in FIG. 12, when the detailed view tab 232 is selected, detailed information about a temperature and humidity 271, a locking state 272, a damper opening angle 273, and a fan operation state 274 are displayed in the monitoring menu 230. That is, the detailed information is detailed information about the operating state of the AHU of the aforementioned system view tab 231.

The temperature and humidity of each of return air, supply air, outdoor air, and mixed air are indicated by numerical values, and a locking state according to control mode is indicated by an icon. Furthermore, the damper open amount of each of the outdoor air, the exhaust air, and the mixed air is indicated. The damper open amount is indicated by closing 0 degree to maximum opening 90 degrees. Furthermore, the fan operation state 274 of each of the return air fan and the supply air fan is displayed. In this case, whether each fan has been turned on or off and whether abnormality has occurred in the fan are displayed.

Figure 13:
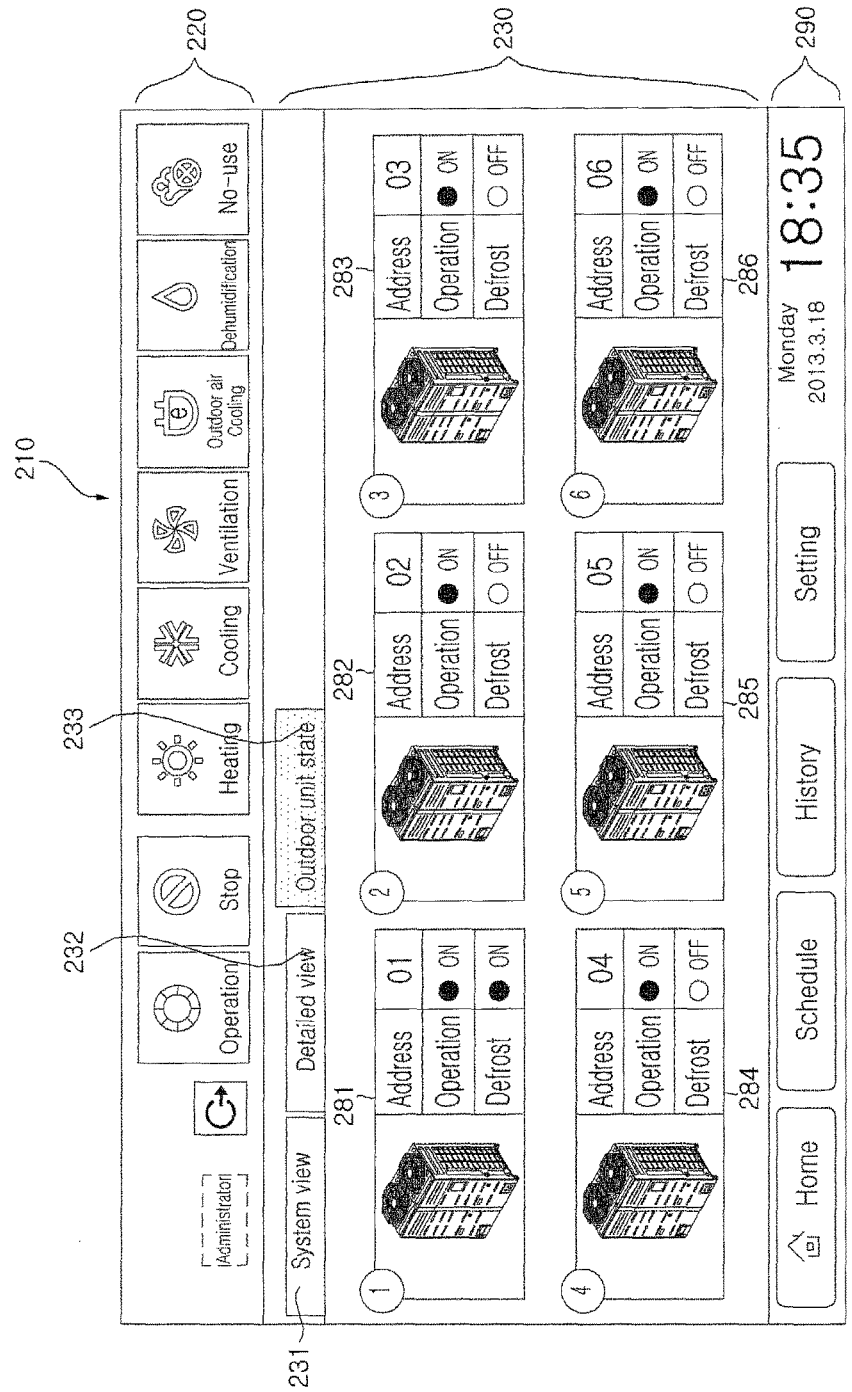

FIG. 13 is an exemplary diagram in which the outdoor unit state of the monitoring menu displayed on the interface unit is displayed. As illustrated in FIG. 13, information about the state of a heat source, in particular, the outdoor unit 2 connected to the AHU 1 is displayed in the monitoring menu 230.

Information about the state of the outdoor unit connected to the AHU 1 is displayed for each outdoor unit (281 to 286). An address for communication with each outdoor unit, the operation state of any one of an operation, a stop, and an error, and whether a defrost operation is performed are displayed.

Furthermore, a plurality of pages may be divided and displayed depending on the number of connected outdoor units 2. If a heat source is not an outdoor unit, for example, if a heat source is a boiler or a cooling top, information about the boiler or cooling top is displayed.

Figure 14:
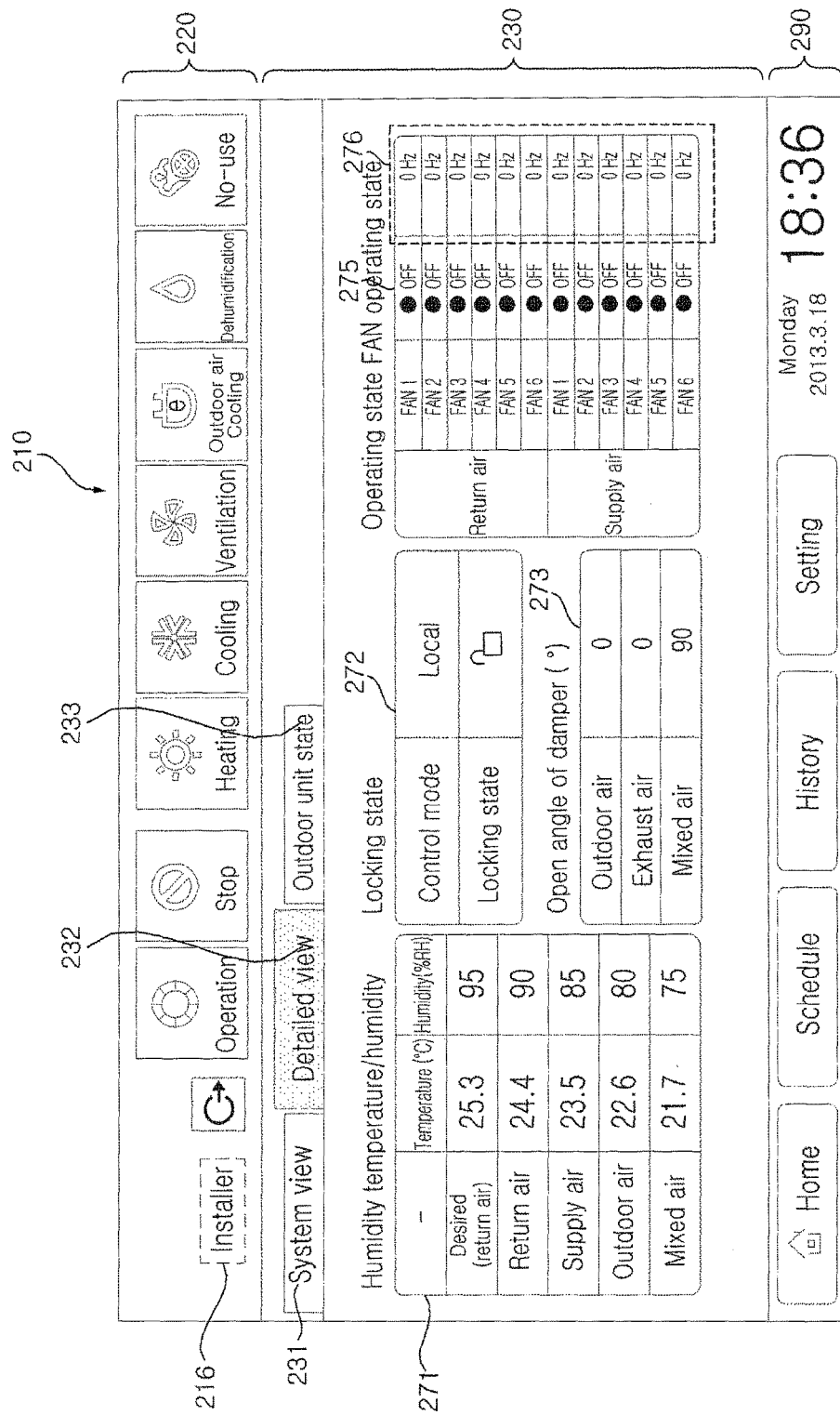

FIG. 14 is an exemplary diagram of the menu screen that is differently displayed depending on the login right of the interface unit. FIG. 14 is a diagram illustrating a screen of the monitoring menu that is differently configured upon installer login in the screen of the monitoring menu displayed when the detailed view tab is selected in FIG. 12.

As illustrated in FIG. 14, upon installer login, when the detailed view tab 232 is selected, the monitoring menu 230 displays detailed view menus having a screen configuration different from that of the detailed view tab upon administrator login.

Upon installer login, the temperature/humidity 271, the locking state 272, and the damper opening 273 are displayed identically with those of the monitoring menu upon administrator login, but the fan operation state 275 is displayed differently from that administrator login.

The operation frequency 276 of each fan in addition to the on/off state of the fan is displayed on the menu screen of the detailed view tab according to installer login. In this case, each of the return air fan and the supply air fan includes a plurality of fans, and may operate in different frequencies.

Figure 15:
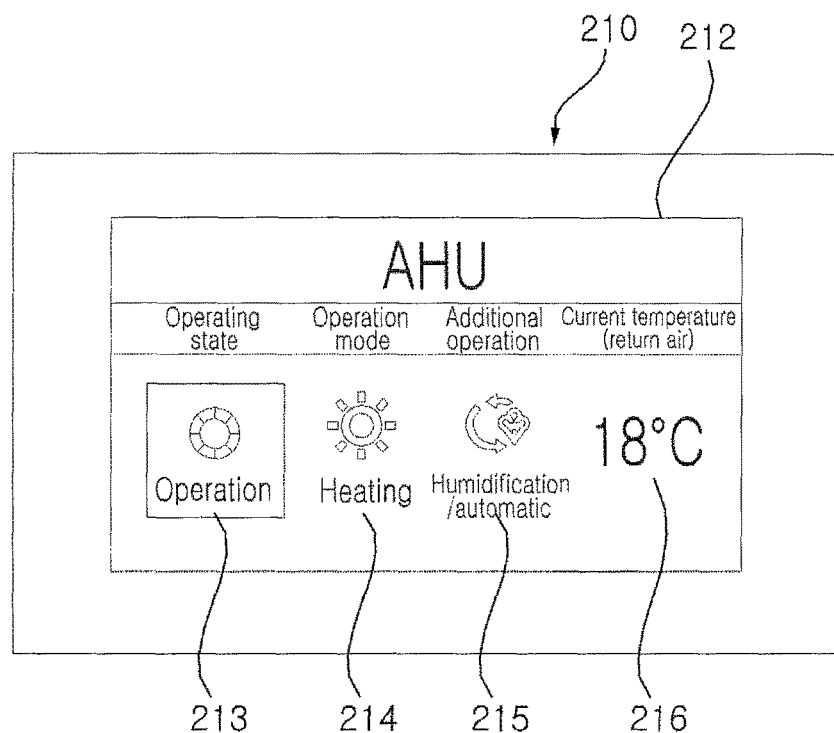
FIG. 15 is an exemplary diagram illustrating the standby screen of the interface unit in accordance with an embodiment of the present invention.

FIG. 15 is an exemplary diagram illustrating the standby screen of the interface unit in accordance with an embodiment of the present invention.

As illustrated in FIG. 15, if there is no input for a specific time, the control unit 111 of the interface unit 5 displays a standby screen 212.

If there is no separate input through the input unit 150 in the state in which the monitoring screen 210 has been output as described above, the control unit 111 switches to and displays the standby screen 212. Brief information about the AHU 1 is displayed on the standby screen 212.

Information about an operation state 213, operation mode 214, an additional operation 215, and a current temperature 216 are displayed on the standby screen 212 as brief information. The information is displayed in the form of an image, an icon, a number or letter, or a combination of them. The operation state indicates whether an operation is in progress. The operation mode indicates information about operation mode that belongs to operation mode, such as heating, cooling, ventilation, dehumidification, and outdoor air cooling, and that has been currently set. A set additional operation is displayed, and a return air temperature is indicated as a current temperature. In this case, an indoor temperature may be based on a return air temperature in the case of a return air temperature and may be based on a supply air temperature if a supply air temperature is an indoor temperature.

Figure 16:
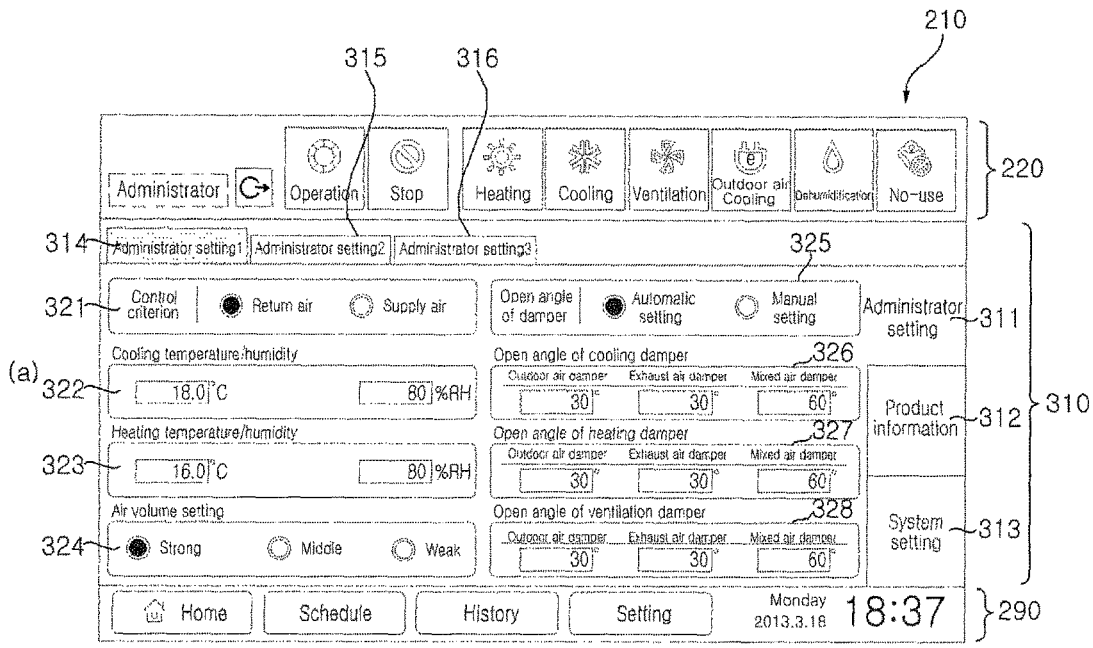
FIGS. 16 to 18 are exemplary diagrams to which reference is made in order to describe the administrator setting menu of the interface unit in accordance with an embodiment of the present invention.
Figure 16:
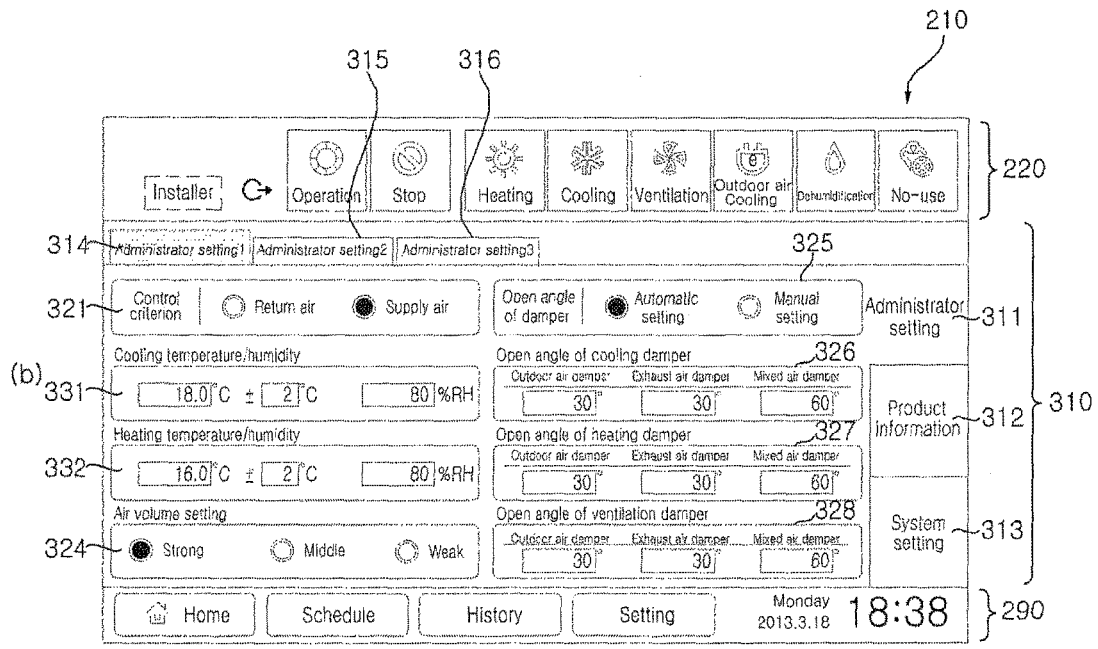
Figure 17:
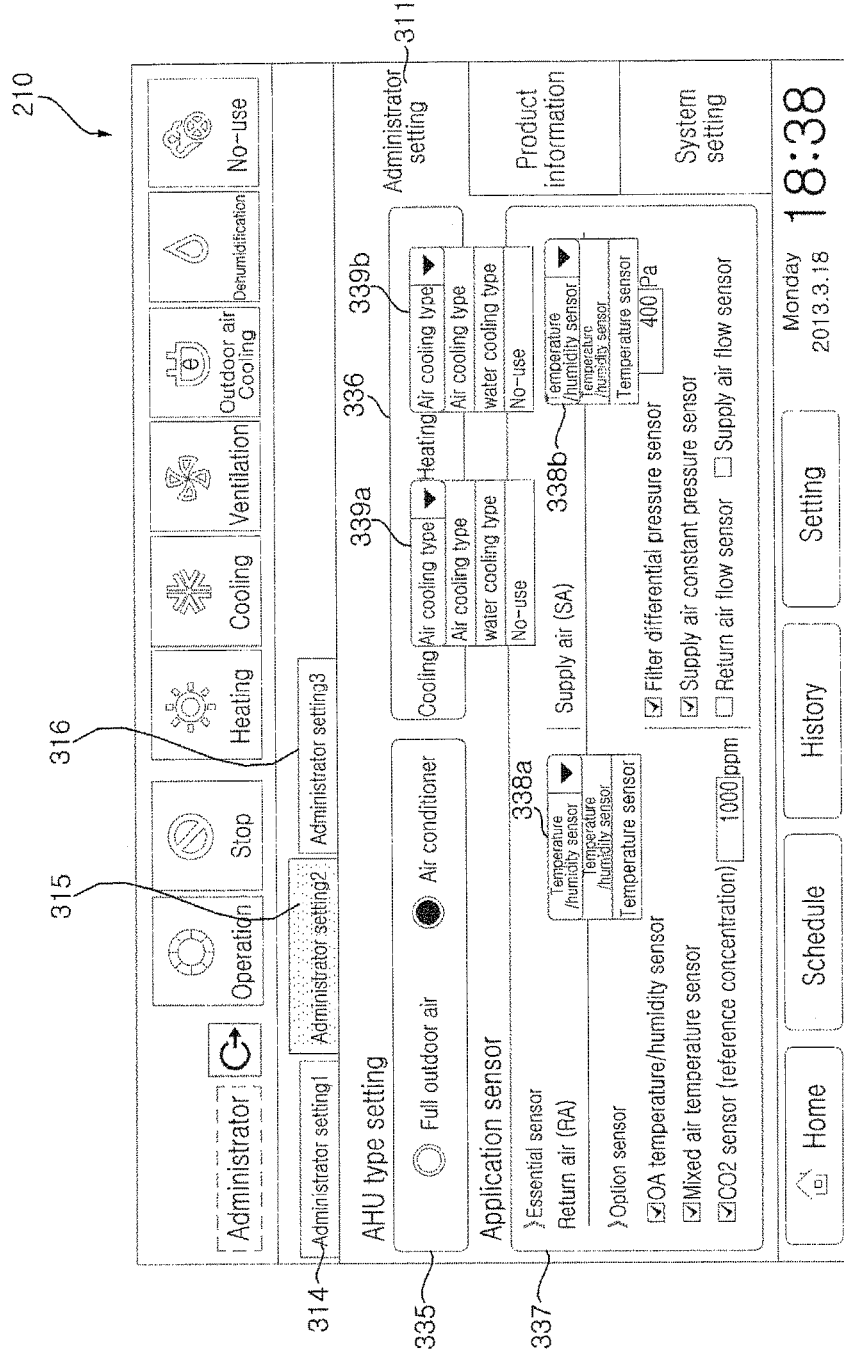
Figure 18:
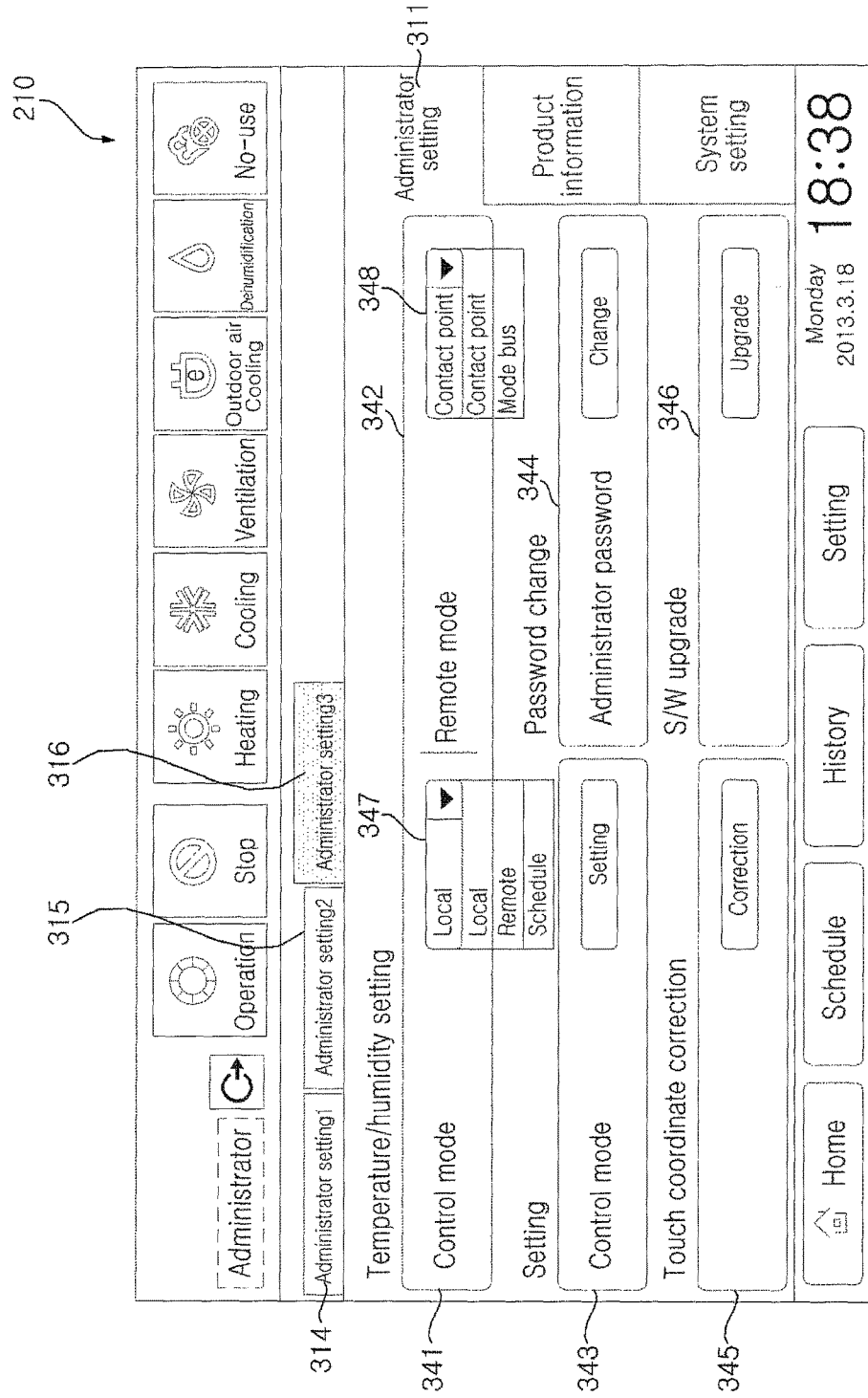

FIGS. 16 to 18 are exemplary diagrams to which reference is made in order to describe the administrator setting menu of the interface unit in accordance with an embodiment of the present invention.

FIG. 16(a) is an example of the menu screen of a first administrator setting tab, and FIG. 16(b) is an example of a menu screen if a control criterion for the first administrator setting tab is set as supply air.

When the setting key 294 is selected in the main menu, as illustrated in FIG. 16(a), a setting menu 310 is displayed. The setting menu 310 includes submenus, such as administrator setting 311, product information 312, and system setting 313. In this case, the administrator setting 311 is a menu for controlling the operation of the AHU 1. The product information 312 displays model information about the AHU 1 or the interface unit 5 or version information about a control program. The system setting 313 is a menu for setting installation information about the AHU 1.

In the administrator setting 311, a menu for administrator setting is divided into a plurality of tabs and displayed as first to third administrator setting tabs 314 to 316. When each tab is selected, a corresponding menu screen is displayed, and thus setting input for controlling the AHU 1 is possible for each function. Basic operation setting for the AHU 1 may be performed through the operation menu 220.

When the first administrator setting tab 314 is selected, menu items for controlling an indoor temperature of the AHU 1, such as a control criterion 321, cooling temperature and humidity 322, heating temperature and humidity 323, airflow setting 324, a damper opening angle 325, a cooling damper opening angle 326, a heating damper opening angle 327, and a ventilation damper opening angle 328, are displayed, and menu screens for inputting data are displayed.

In the control criterion 321, an indoor temperature that may be selected from return air and supply air and that becomes a basis for temperature control is selected from a return air temperature and a supply air temperature. If the return air temperature is selected as the indoor temperature, a temperature of return air that is indoors circulated and returned back is measured, and temperature control is performed based on the measured temperature. If the supply air temperature is selected as the indoor temperature, a temperature of supply air that is indoors supplied is maintained at a set temperature. When the control criterion is set, a criterion for a temperature in the monitoring menu of the aforementioned detailed view is changed and displayed.

In the cooling temperature and humidity 322 and the heating temperature and humidity 323, in the case of operations in cooling mode and heating mode, the cooling temperature and humidity 322 and the heating temperature and humidity 323 are target temperature and humidity. The temperature may be input in unit of 0.1 degree, and there may be a limit to a temperature that can be input. For example, a cooling temperature of less than 18 degrees may not be input, and a heating temperature of over 30 degrees may not be input. This is changed depending on setting. The airflow setting relates to an air volume of the AHU 1, and may be set as one of strong, middle, and weak.

In the damper opening angle 325, automatic setting or manual setting may be selected in controlling a damper opening angle. If automatic setting is selected, a damper opening angle is automatically changed. In the cooling damper opening angle 326, the heating damper opening angle 327, and the ventilation damper opening angle 328, if operations are cooling mode, heating mode, and ventilation mode, the opening angles of an outdoor air damper, an exhaust air damper, and a mixed damper are set. If the damper opening angle 325 is manual setting, the damper opening angle is determined depending on a set open angle. If the damper opening angle 325 is automatic setting, a set open angle is a basis, but the open angle of the damper may be changed depending on the operation state or a change of an indoor environment. In this case, when the open angle of the damper is 0 degree, the damper is a closed state. When the open angle of the damper is 90 degrees, the damper is a maximum open state. The open angles of the outdoor air damper, the exhaust air damper, and the mixed damper are determined in conjunction with each other. Since outdoor air corresponding to the amount of exhaust air discharged from the AHU 1 is introduced, the amount of the exhaust air is the same as the amount of the outdoor air. Accordingly, the open angles of the outdoor air damper and the exhaust air damper are identically set, and the sum of the mixed air and the outdoor air is 100. Accordingly, the sum of the open angle of the outdoor air damper and the open angle of the mixed damper becomes 90 degrees.

If the set value of each of the menu items of the first administrator setting tab 314 is input as described above, the control unit 111 stores set data in the data unit 116 and sends the set data to the main unit 110 of the controller 4. The main unit 110 of the controller 4 changes setting based on the received data and performs control so that the AHU 1 operates based on the changed data.

If a return air temperature sensor or a temperature/humidity sensor has not been installed, in a temperature criterion, a supply air temperature becomes an initial value. If the set value of an item in which a corresponding sensor has not been installed is input, the control unit 111 outputs a warning.

As illustrated in FIG. 16(b), if supply air is set as a control criterion 321 in the menu screen of the first administrator setting tab 314, the controller 4 performs temperature control on the AHU based on a supply air temperature.

If supply air is set as the control criterion, the control criterion 321, the cooling temperature and humidity 331, the heating temperature and humidity 332, the airflow setting 324, the damper opening angle 325, the cooling damper opening angle 326, the heating damper opening angle 327, and the ventilation damper opening angle 328 are displayed on a menu screen displayed when the first administrator setting tab 314 is selected. The cooling temperature and humidity 322 and the heating temperature and humidity 323 are displayed differently from a case where return air is set as the control criterion.

In the cooling temperature and humidity 331 and the heating temperature and humidity 332, a target temperature and humidity are input in each of operations in cooling mode and heating mode. The control range of the temperature may be set. For example, assuming that a target temperature in cooling mode is 18 degrees, if a permission range upon installer login is set as 2 degrees, 16 degrees to 20 degrees become a control range for a target temperature by 2 degrees based on 18 degrees. The control range may be set for 1 degree.

FIG. 17 is a diagram illustrating an example of the menu screen of the second administrator setting tab. As illustrated in FIG. 17, when the second administrator setting tab 315 is selected in the administrator setting menu 311, a menu screen including menu items, such as the type 335 of the AHU, the heat exchange method 336 of the AHU, and the application sensor 337, is displayed.

In the type 335 of the AHU, one of full outdoor air and air-conditioning air may be set. The type 335 of the AHU is air-conditioning air if mixed air of outdoor air and return air is supplied as supply air or full outdoor air if only outdoor air not including return air is supplied as supply air when the AHU 1 supplies the supply air to the interior of a room. That is, if the AHU includes the supply air unit, the heat exchange unit, the outdoor air unit, and the exhaust air unit without a return air unit, the type 335 of the AHU is full outdoor air. Furthermore, although a return air unit is included, if the outdoor air damper and the exhaust air damper are open at a maximum of 100% and supply air is supplied using only outdoor air, the type 335 of the AHU may be set as full outdoor air.

Furthermore, in the heat exchange method 336 of the AHU, the heat exchange of a refrigerant using a fan is divided into a case where a refrigerant is subject to a heat exchange and a case where a refrigerant is subject to a heat exchange, and the heat exchange methods 339a, 339b for cooling and heating may be set as an air cooling type and a water cooling type. Furthermore, no-use may also be set. In the heat exchange method 336, a heat exchange method that is the same as a method actually installed in the AHU 1 needs to be set. In this case, no-use may correspond to a case where a heat exchange is not performed and outdoor air cooling is performed using only outdoor air. The heat exchange method is displayed so that it can be selected in a drop & down menu manner.

In the application sensor 337, a sensor installed in the AHU 1 is set. That is, the type of a sensor that has been actually installed is set. In this case, the control menu for controlling the AHU 1 may be changed depending on the setting state of the application sensor 337.

The application sensor 337 is divided into an essential sensor and an optional sensor.

The essential sensor includes a return air sensor and a supply air sensor, and the type 338a, 338b of an installed sensor may be set. Regarding each of the return air sensor and the supply air sensor, one of a temperature/humidity sensor and a temperature sensor may be set, and a selection menu may be displayed in a drop & down menu manner. The temperature/humidity sensor measures a temperature and humidity.

In the optional sensor, an outdoor air temperature/humidity sensor, a mixed air temperature sensor, a carbon dioxide sensor, a filter differential pressure sensor, a supply air constant pressure sensor, a return air flow sensor, and a supply air flow sensor may be set. In the case of the carbon dioxide sensor, a reference value for determining the degree of a contamination is input. In the case of the filter differential pressure sensor, criterion pressure for outputting an error or warning is input.

In the application sensor 337, if a sensor not installed in the AHU 1 is selected, the control unit 111 may determine an error because corresponding data is not input. Furthermore, if a sensor has been installed in the AHU, but has not been set, an error is not generated, but control related to the corresponding sensor cannot be used. For example, if a carbon dioxide sensor (CO2) sensor has not been set, the control unit 111 removes an icon for CO2 from a monitoring screen, does not display related control menu by deactivating the related control menu, or makes a corresponding item not selected.

FIG. 18 is a diagram illustrating an example of the menu screen of the third administrator setting tab 316. As illustrated in FIG. 18, when the third administrator setting tab 316 is selected in the administrator setting menu 311, a menu screen including items, such as temperature humidity mode setting 341, language setting 343, touch coordinate correction 345, a password change 344, software SW, and upgrade 346, is displayed.

The temperature humidity mode setting 341 is for setting control mode in relation to a temperature and humidity. In the control mode, one of local, remote, and a schedule may be set. If remote mode is set, one of a contact point and a mode bus may be set. Each item is displayed in the form of a drop & down menu.

Figure 19:
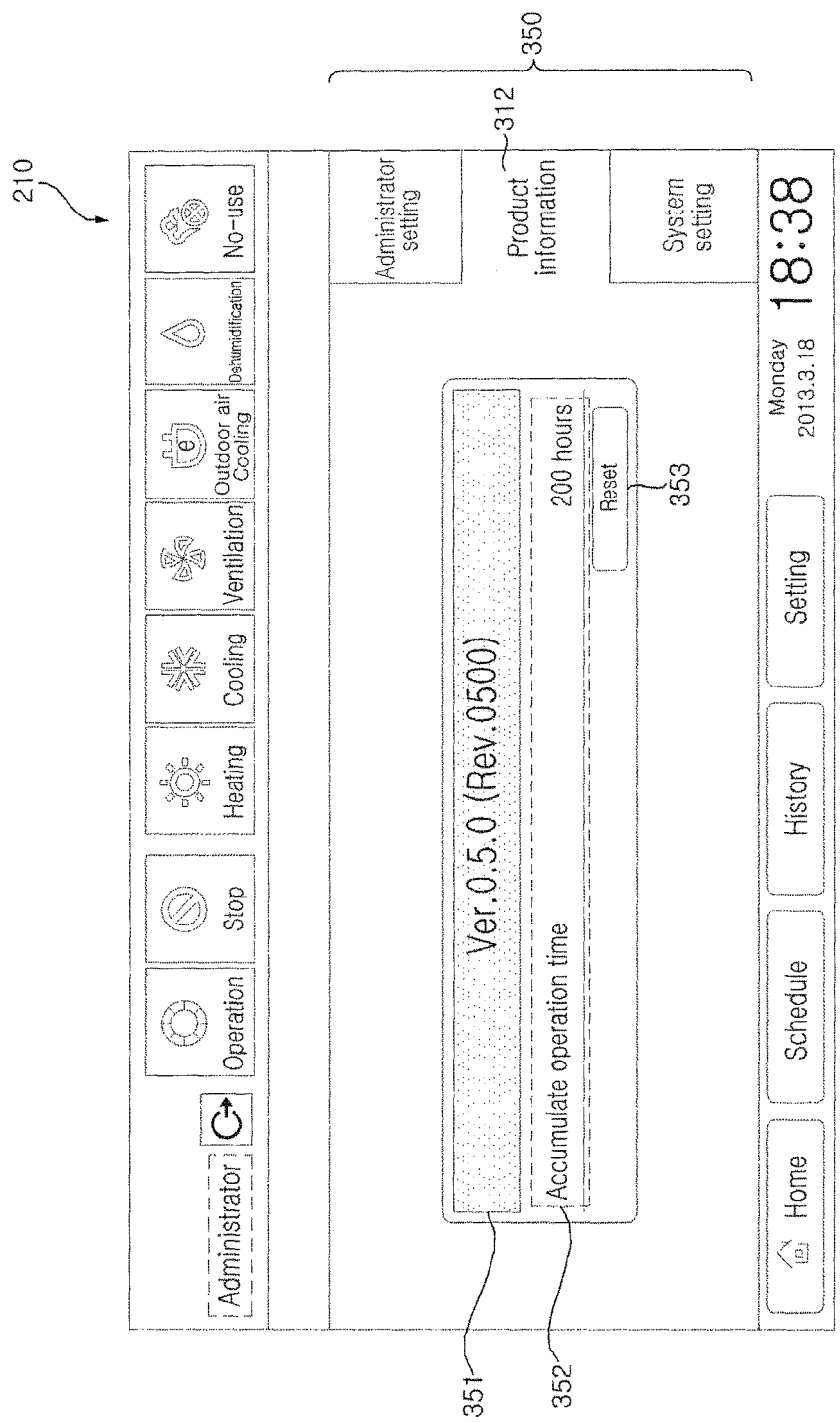
FIG. 19 is an exemplary diagram illustrating the product information screen of the interface unit in accordance with an embodiment of the present invention.

In the language setting 343, a language for all the menus displayed on the interface unit 5 may be changed. If a setting key is selected, a changeable language list is displayed. In the password change 344, a password that is input upon login to the interface unit 5 is changed. Only a password of a login right may be changed. That is, an administrator cannot change the password of a user or installer. In the touch coordinate correction 345, if the interface unit 5 is formed of a touch screen or includes input means, such as a touch pad, the touch coordinate correction 345 enables data to be input in response to a touched location, that is, a key disposed at a touched location is selected. If locations are not matched, that is, if a region A is touched, but a region B is selected, the regions A and B are matched through coordinate correction. The software upgrade 346 includes a menu screen displayed on the interface unit 5. A program for monitoring or control is downloaded from an external program providing server and updated. The update program may be received through the controller or may be directly downloaded from the controller, if necessary. FIG. 19 is an exemplary diagram illustrating the product information screen of the interface unit in accordance with an embodiment of the present invention.

As illustrated in FIG. 19, when the product information 312 is selected, version information 351 about a program now installed in the interface unit 5 and the operation time 352 of the AHU are displayed.

When a program is updated through the software upgrade in the administrator setting menu, the version information displayed in the product information is updated with the updated program version and displayed.

The operation time 352 is data received through the controller 4, and indicates a total time in which the AHU 1 has operated. When a reset key 353 is selected, an accumulated operation time is reset to 0 and is counted from 0. In this case, the reset of the accumulated operation time can be selected only upon installer login. If the time needs to be newly counted as in the case where the configuration of the AHU 1 is changed, the time may be reset upon installer login. In the case of administrator login, the version information and the operation time are displayed, but the reset key may be deactivated so that it cannot be selected or may not be displayed.

FIGS. 20 to 24 are exemplary diagrams to which reference is made in order to describe the system setting menu of the interface unit in accordance with an embodiment of the present invention.

Figure 20:
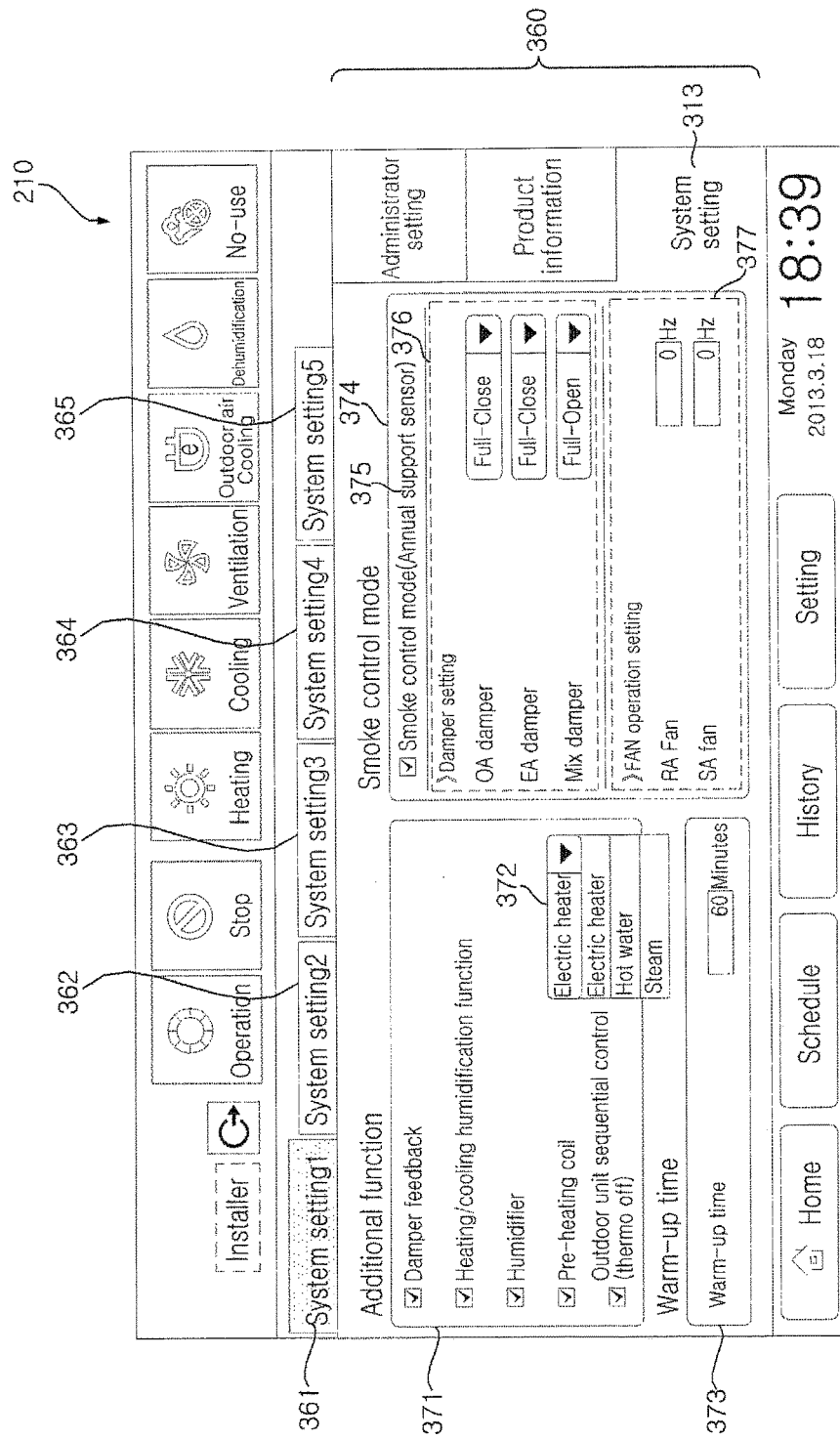
FIGS. 20 to 24 are exemplary diagrams to which reference is made in order to describe the system setting menu of the interface unit in accordance with an embodiment of the present invention.

As illustrated in FIG. 20, when a first system setting tab 361 is selected in the system setting menu 313 of the interface unit, items, such as an additional function 371, a warm-up time 373, and smoke control mode 374 for the AHU 1, are displayed on a menu screen.

In the additional function 371, damper feedback, a cooling humidification function, a humidifier, a warm-up coil, and outdoor unit sequential control can be selected. When the additional function is selected, the operation of a selected additional function may be set through the additional operation key 229 of the operation menu 220. The damper feedback relates to whether a feedback signal will be received from a damper. In the damper feedback, a feedback signal regarding the opening angle of the damper is sent to the controller 4 and displayed on the monitoring screen of the interface unit 5. The cooling humidification function is possible when a humidifier is available. Since a dehumidification effect is present upon cooling, humidification may be additionally performed. In the warm-up coil, any one of an electric heater, hot water, and steam may be selected as the type of heat source. The type of warm-up coil is set identically with that of a device installed in the AHU 1.

In the additional function, the cooling humidification and the humidifier may be set if a humidifier is installed in the AHU 1, and the warm-up coil may be set if a device for supplying a heat source, such as a heater or a boiler, is installed in the AHU 1. If a function not installed in the AHU 1 is selected, the controller 4 generates an error, and the interface unit 5 outputs the error to a screen.

In the warm-up time 373, a preparation time is set because when the AHU 1 operates, it cannot set an indoor temperature by immediately performing a set operation as soon as the operation is started and there is a need for a time when each device including the outdoor unit is prepared for the operation. In this case, during the warm-up time, the AHU 1 starts the operation of each device based on set operation mode, such as controlling a damper and controlling a heat source, and then starts a set operation after a full-scaled operation becomes possible. In this case, although the full-scaled operation does not satisfy the start condition, after a lapse of the warm-up time, the controller 4 controls the AHU 1 so that it operates based on operation setting. That is, the warm-up time is a maximum permission time for warm-up, and prevents the delay of the full-scaled operation so that a warm-up operation is not maintained for a long time.

In the smoke control mode 374, smoke control mode setting 375 depending on whether a smoke detection sensor has been installed is possible. If a fire signal is received from the smoke detection device of the building controller, smoke control mode can be set. In the smoke control mode 374, damper setting 376 and fan operation setting 377 are possible.

In the damper setting 376, the open angle of each of an outdoor air damper, an exhaust air damper, and a mixed damper may be set. In the fan operation setting 377, a frequency for the rotation operation of a return air fan and a supply air fan may be set.

If the smoke control mode is set and smoke is detected by the smoke detection sensor or a fire signal is received, the controller 4 may set the open angle of the damper of the AHU 1 according to the damper setting 376. When a fire is generated, the outdoor unit stops operating, and the AHU 1 stops a series of operations including a heat exchange, but the damper operates at a designated open angle according to the smoke control mode setting. Furthermore, the controller 4 performs control so that a return air fan and a supply air fan operate in a specific frequency according to the fan operation setting 377.

Figure 21:
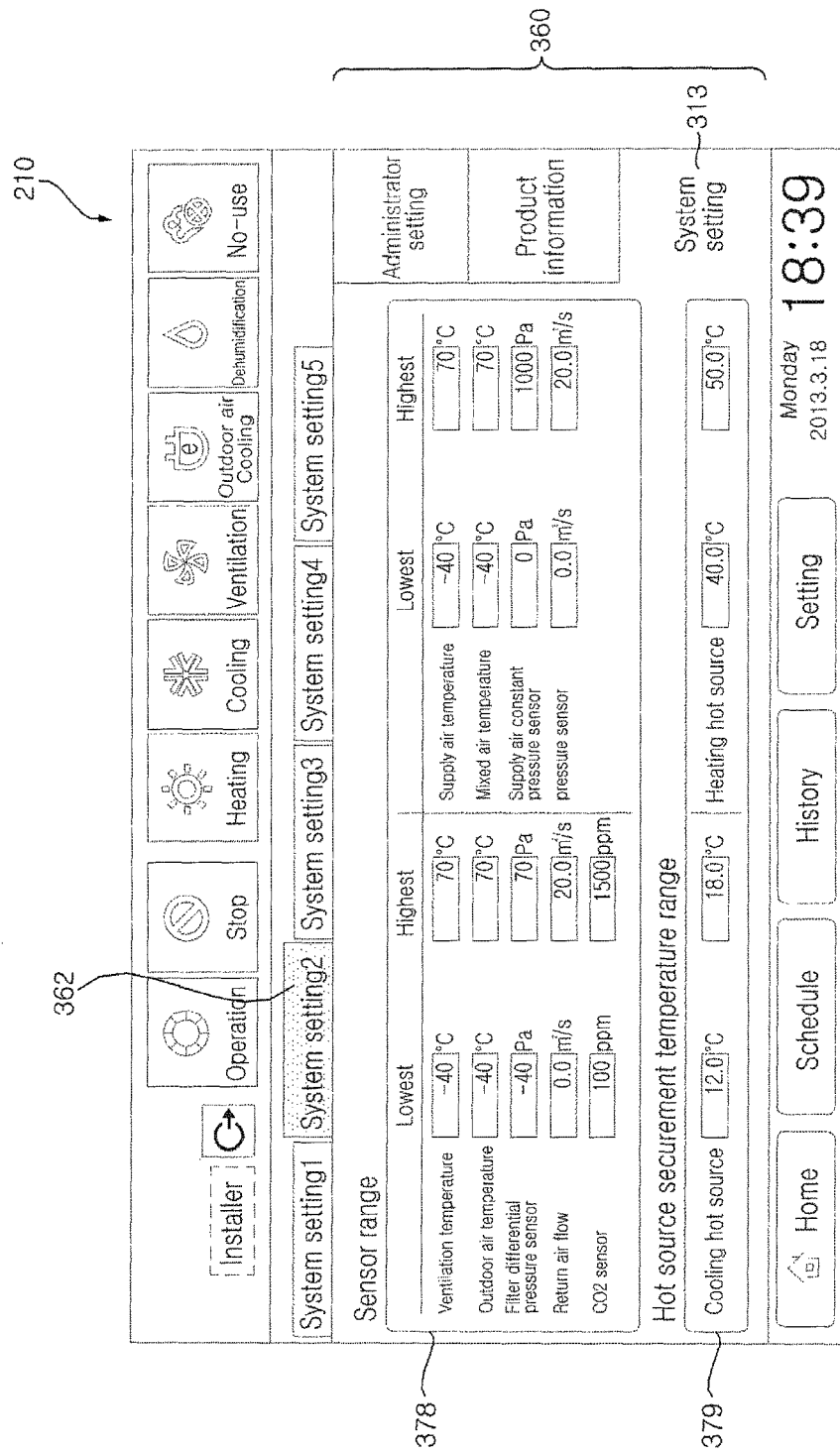

As illustrated in FIG. 21, when the second system setting tab 362 is selected in the system setting menu 313 of the interface unit, a menu screen including a sensor range 378 and a heat source securement temperature range 379 is displayed.

In the sensor range 378, a range value that may be detected according to the characteristics of each of a plurality of sensors installed in the AHU 1 is set. Since the lowest value and highest value of the sensor that may be detected can be input, various models may be selectively installed in the AHU 1 although a sensor of a specific model is not installed.

Each of a return air temperature sensor, an outdoor air temperature sensor, a filter differential pressure sensor, a return airflow sensor, a carbon dioxide sensor, a supply air temperature sensor, a mixed air temperature sensor, a supply air constant pressure sensor, and a supply airflow sensor may be set. A sensor range may not be input with respect to a sensor that has not been installed. If the sensor range of an installed sensor is not input, but the corresponding sensor has been set as having been installed, when an initial value is automatically input and a function related to the sensor is selected, the initial value is determined to be the data of the sensor.

When the sensor range is set, the control unit 111 stores the set data in the data unit 116 and sends the set data to the main unit 110 of the controller 4.

In the heat source securement temperature range 379, when the AHU 1 performs temperature control, the lowest value and highest value of a temperature that may be secured with respect to a cooling heat source and a heating heat source are set. The lowest value and highest value of a heat source securement temperature become a criterion for a determination when an outdoor unit is added or when the number of outdoor units is decreased in controlling the number of outdoor units. For example, if the cooling heat source securement temperature of a supply air temperature exceeds the highest value during a cooling operation, an outdoor unit is added and driven. If the cooling heat source securement temperature of a supply air temperature becomes less than the lowest value, the number of outdoor units is reduced during the operation. Furthermore, although the number of outdoor units is not controlled based on a heat source securement temperature, an indoor temperature is controlled so that it does not exceed the highest value and lowest value of the heat source securement temperature. That is, the heat source securement temperature range 379 becomes a temperature rang that may be controlled upon temperature control.

Figure 22:
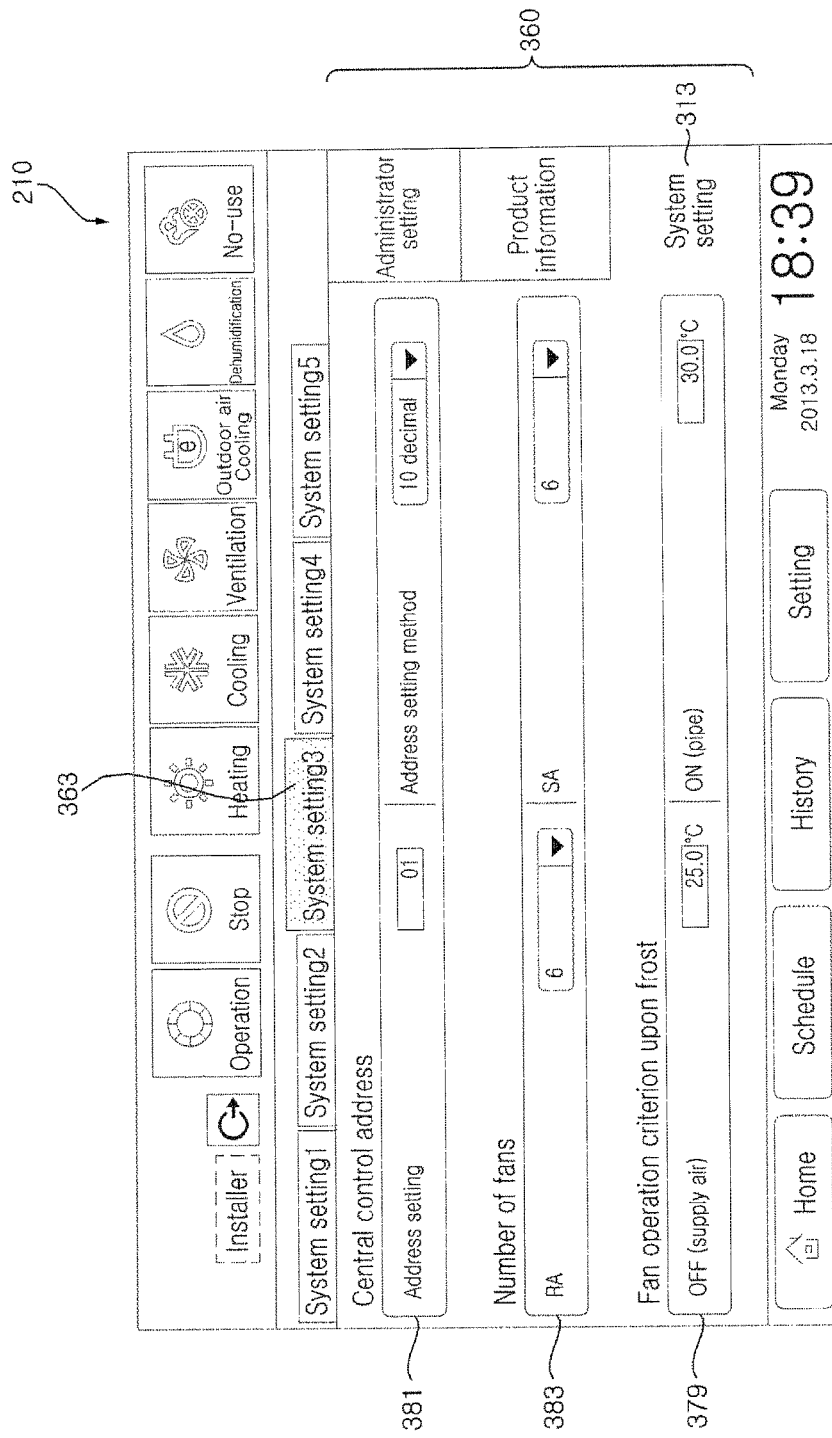

As illustrated in FIG. 22, when the third system setting tab 363 is selected, a menu screen including setting items, such as a central control address 381, a fan number 383, and a defrost fan operation criterion 379, is displayed.

In the central control address 381, the address of the AHU 1 to be controlled is set. In this case, an address setting method is a method of displaying an address, and any one of a decimal number and a hexadecimal may be set.

In the fan number 383, the number of installed return air fans and supply air fans is set. 1, 2, 4, or 6 may be set. In the defrost fan operation criterion 384, when a defrost operation is performed, the value of a temperature at which the operation of a fan is stopped and the value of a temperature at which the fan starts operating are input. For example, when a defrost operation is performed, if a supply air temperature is 25 degrees or more, the operation of the fan may be stopped. If a pipe temperature is 30 degrees or more, the fan may operate.

Figure 23:
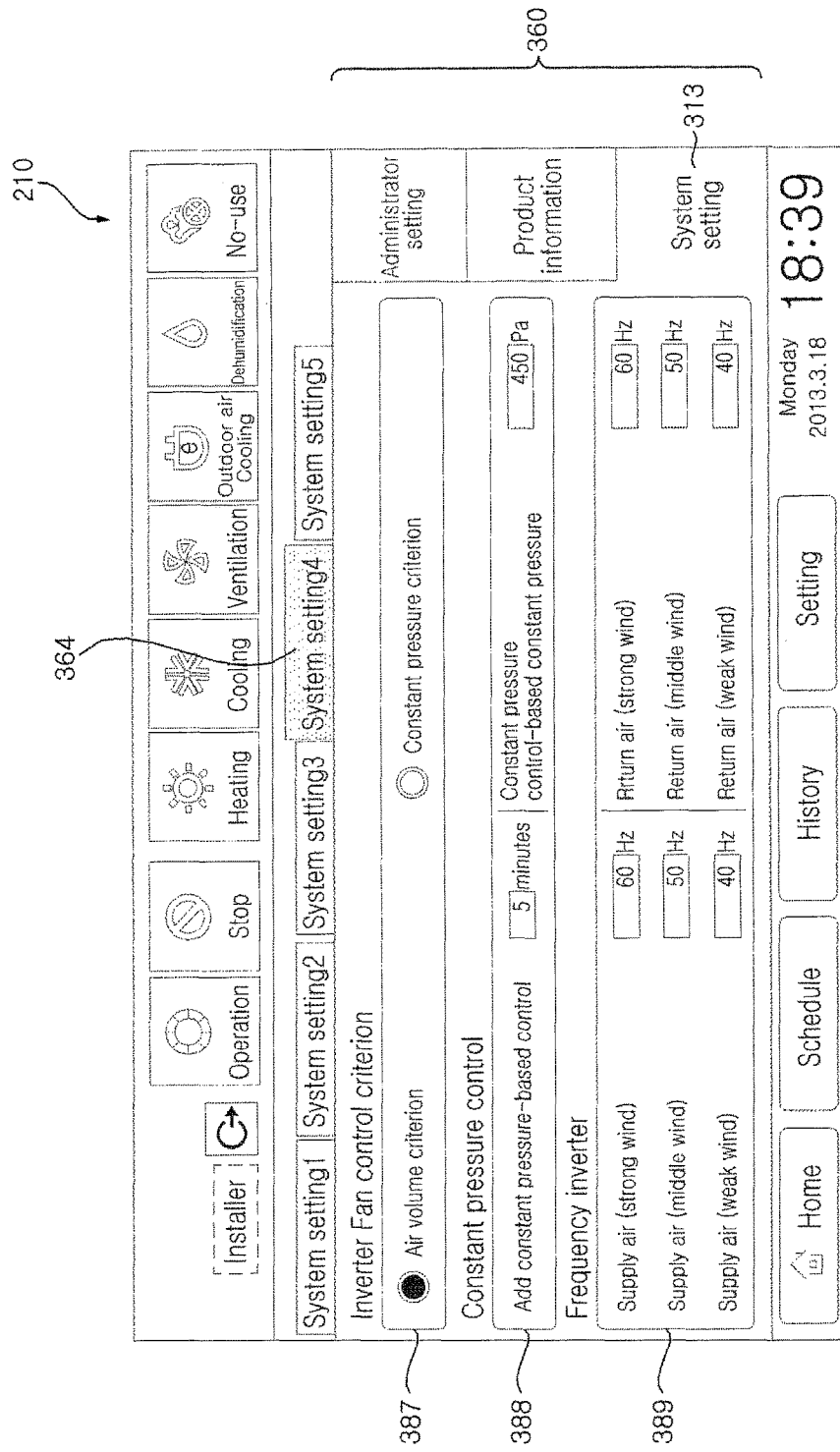

As illustrated in FIG. 23, when the fourth system setting tab 364 is selected, a menu screen, including an inverter fan control criterion 387, constant pressure control 388, and an inverter frequency 389, is displayed on display means of the output unit 115.

In the inverter fan control criterion 387, whether an inverter fan will be controlled based on the amount of wind or constant pressure is set. Whether an inverter fan is controlled in a determined frequency according to strong, middle, and weak according to airflow setting or whether an inverter fan will be controlled based on pressure within the AHU 1 on the basis of constant pressure is determined.

In the constant pressure control 388, if the inverter fan control criterion is set as a constant pressure criterion, a control cycle based on constant pressure and a pressure value, that is, a criterion for control, are set.

In the inverter frequency 389, if the inverter fan is controlled based on the amount of wind, the operation frequency of the inverter fan according to strong wind, middle wind, and weak wind for each of prohibition and return air is set. In this case, although strong wind is set according to such setting, the actual amount of wind may be different depending on frequency setting. The degree of strong, middle, or weak wind may be changed and set depending on an environment in which the AHU is installed.

Figure 24:
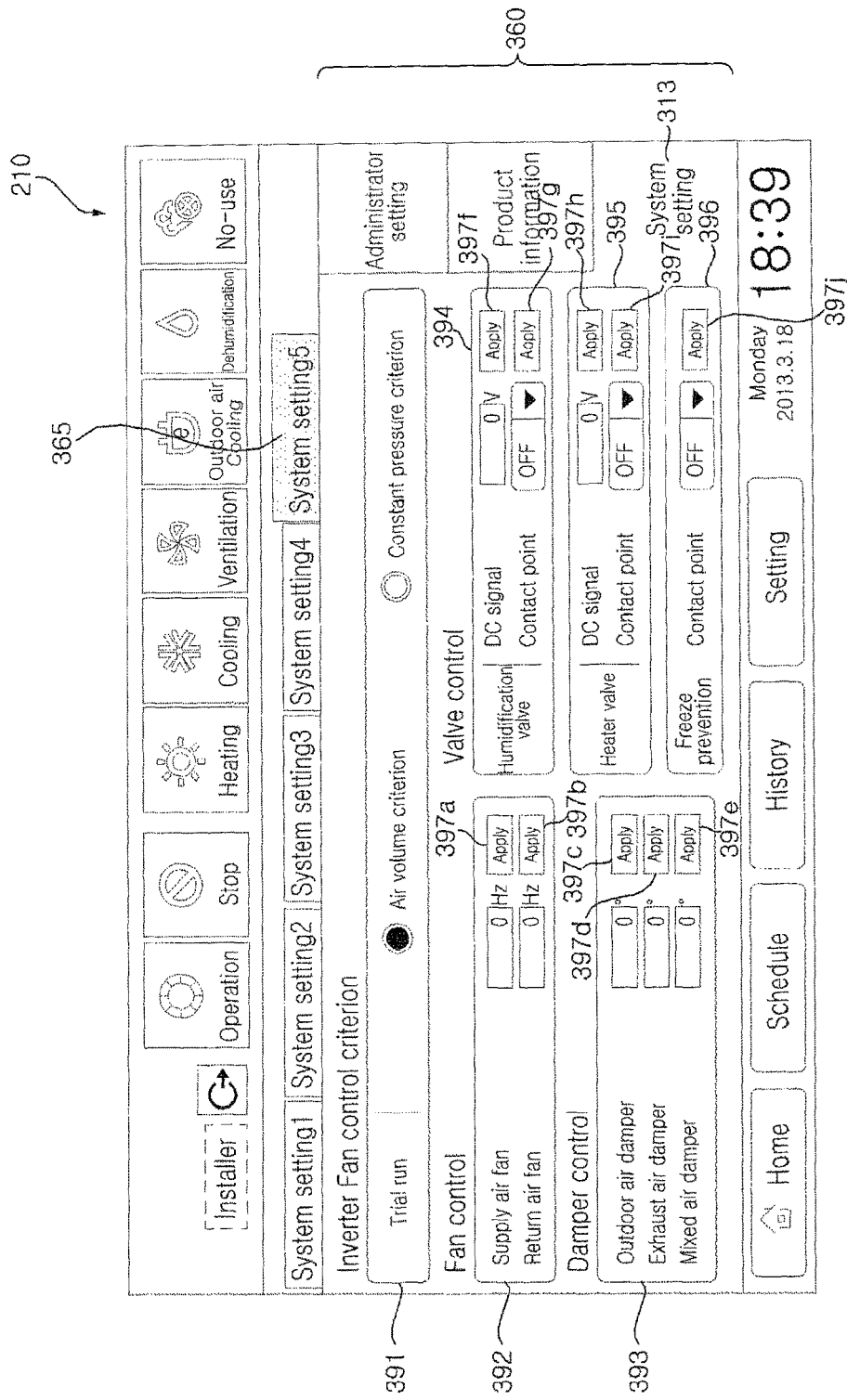

As illustrated in FIG. 24, when the fifth system setting tab 365 is selected, a menu screen, including an inverter fan control criterion 391, fan control 392, damper control 393, a humidification valve 394 when a value is controlled, a heater valve 395, and a freeze prevention contact point 396 in a test drive situation, is displayed.

In the inverter fan control criterion 391, when a test drive is performed, whether an inverter fan will be controlled based on the amount of wind or constant pressure is set in controlling the inverter fan in order to check the operation of the inverter fan.

Furthermore, in the fan control 392, when a test drive is performed, the operations of a supply air fan and a return air fan are checked by inputting an operation frequency to each of the supply air fan and the return air fan. In this case, if a frequency is input and an application key 397*a*, 397*b* is selected, a fan corresponding to the selected application key operates.

For example, if the frequency of a supply air fan is input and the application key 397*a* is selected, the control unit 111 sends the input data to the main unit 110 of the controller 4. The main unit 110 applies a control signal to the driving unit, and the driving unit drives a supply air fan in the input frequency. When the supply air fan operates, the operating state of the supply air fan is displayed in the aforementioned monitoring menu or detailed view, and the operating frequency of the supply air fan upon installer login is also displayed. The installer can check whether the supply air fan operates in the input frequency when a test drive is performed.

In the damper control 393, when the open angle of each of an outdoor air damper, an exhaust air damper, and a mixed damper is input and application keys 397*d* to 397*e* are selected, the damper opening angle of the AHU 1 is changed. In this case, the control unit 111 of the interface unit 5 sends data to the main unit 110 of the controller 4. The main unit 110 sends a control signal to the input/output unit 120 in order to control a corresponding damper.

In the valve control, if a humidifier has been installed, a test drive is performed on a DC signal and a contact point signal for the humidification valve 394 by selecting the application key 397*f*, 397*g*. A test drive is performed on a DC signal and contact point signal for the heater valve 395 is performed by selecting the application key 397*h*, 397*i*. Furthermore, for freeze prevention, whether a contact point signal operates may be checked by selecting the application key 397*i*.

In the case of a test drive, the plurality of application keys 397*a* to 397*j* is included, so a test drive can be performed on each device. In this case, a test drive can be performed on a device corresponding to a selected application key, and a test drive cannot be performed on a plurality of devices at the same time.

Such a system setting menu is displayed upon installer login. Data is input in accordance with a device installed in the AHU 1 in an installation step. Furthermore, after the device is installed, the system setting menu is used for a test drive for checking whether the device normally operates. Upon administrator login, the system setting 313 is not basically displayed, and the input of new data or the edit of previous setting are impossible, but the viewing of previous set information may be possible according to circumstances.

Figure 25:
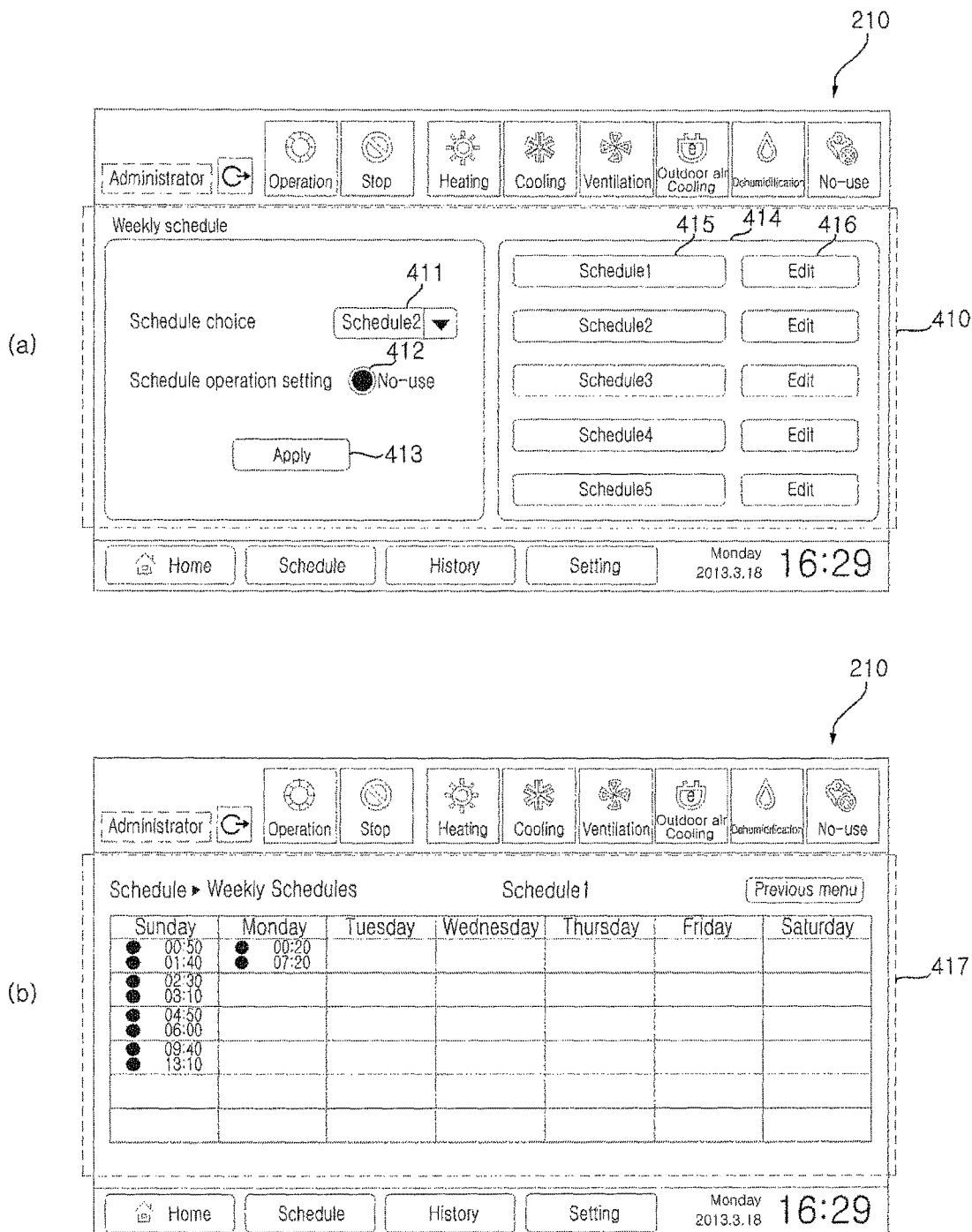
FIGS. 25 and 26 are exemplary diagrams to which reference is made in order to describe the schedule setting menu of the interface unit in accordance with an embodiment of the present invention.
Figure 26:
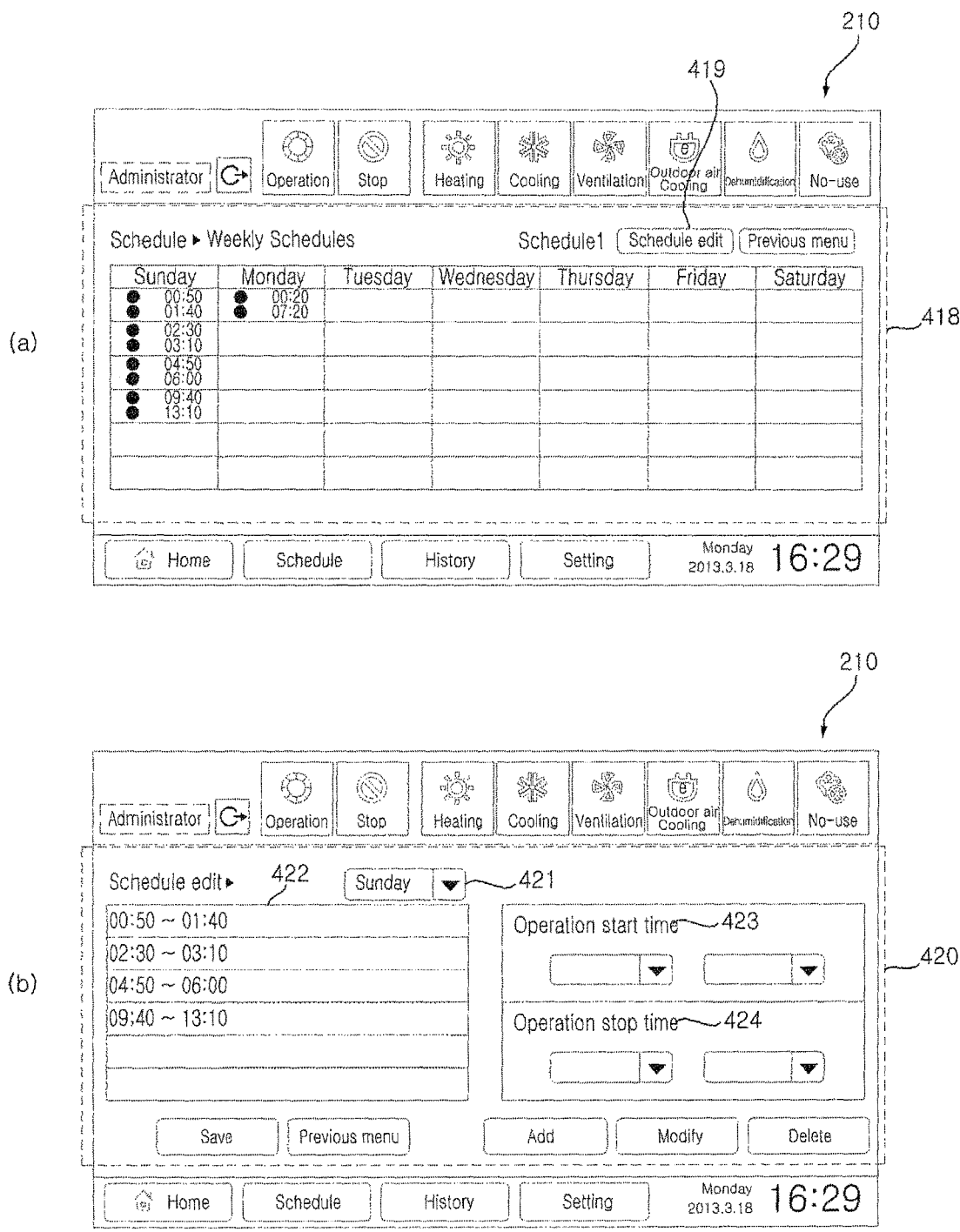

FIGS. 25 and 26 are exemplary diagrams to which reference is made in order to describe the schedule setting menu of the interface unit in accordance with an embodiment of the present invention.

As illustrated in FIG. 25(*a*), when the schedule key 292 is selected, a schedule setting menu 410 is displayed on a screen. In the schedule setting menu 410, the operation schedule of the AHU 1 is input, added, or changed.

A preset schedule list 414 is displayed in the schedule setting menu 410, and the schedule key of each schedule and the edit key 416 of each schedule are included in the preset schedule list 414.

Furthermore, the schedule setting menu 410 includes a schedule selection 411 for selecting any one of currently applied schedules, selected schedule operation setting 412, and an application key 413. The schedule operation setting 412 is displayed as being application in the case of schedule mode. If the AHU 1 is controlled in local or remote mode, the schedule operation setting 412 is displayed as being no-used. In the application key 413, setting is applied to a changed schedule or a selected schedule in the schedule setting menu 410.

In this case, when any one schedule is selected in the schedule list 414, for example, when a schedule1 415 is selected, as illustrated in FIG. 25(*b*), set schedule information 417 is displayed in a schedule1. A schedule according to the time for each day-of-the-week is displayed in the schedule information.

In FIG. 25(*a*), when an edit key 416 is selected, an edit screen for a corresponding schedule is displayed. In this case, when the edit key 416 for the schedule1 415 is selected, a schedule edit menu for the schedule1 is displayed. When an edit key for a schedule2 is selected, an edit menu for a schedule2 is displayed.

As illustrated in FIG. 26(a), a schedule pattern according to the time for the day-of-the-week of the schedule1, that is, a selected schedule, and a schedule edit key 419 are displayed in the schedule edit menu 418.

When the schedule edit key 419 is selected, a new schedule may be added to the schedule1 or a preset schedule may be modified or deleted.

When the schedule edit key 419 is selected, as illustrated in FIG. 26(b), an edit menu 420 is displayed. Day-of-the-week selection 421 for selecting a day-of-the-week to be edit is displayed in the edit menu 420 in a drop & down menu form, and a schedule pattern 422 for the selected day-of-the-week are displayed. When the day-of-the-week is changed, the schedule pattern 422 is also changed and displayed.

Furthermore, when any one of schedule pattern items for each time displayed in the schedule pattern 422 is selected, a corresponding operation start time 423 and operation stop time 424 can be input. When a modification key is selected, a corresponding time schedule pattern is changed. In this case, when a delete key is selected, the corresponding time schedule pattern is deleted. Furthermore, if a predetermined schedule is not selected and an additional key is selected after inputting an operation start time and operation stop time, a new schedule pattern is additionally input. Changed information according to the addition, modification, and deletion of a pattern item is displayed in the schedule pattern 422.

When a storage key is selected, a changed schedule pattern is stored. When a previous menu is selected, the menu returns to the schedule edit menu 418 illustrated in FIG. 26(a).

Figure 27:
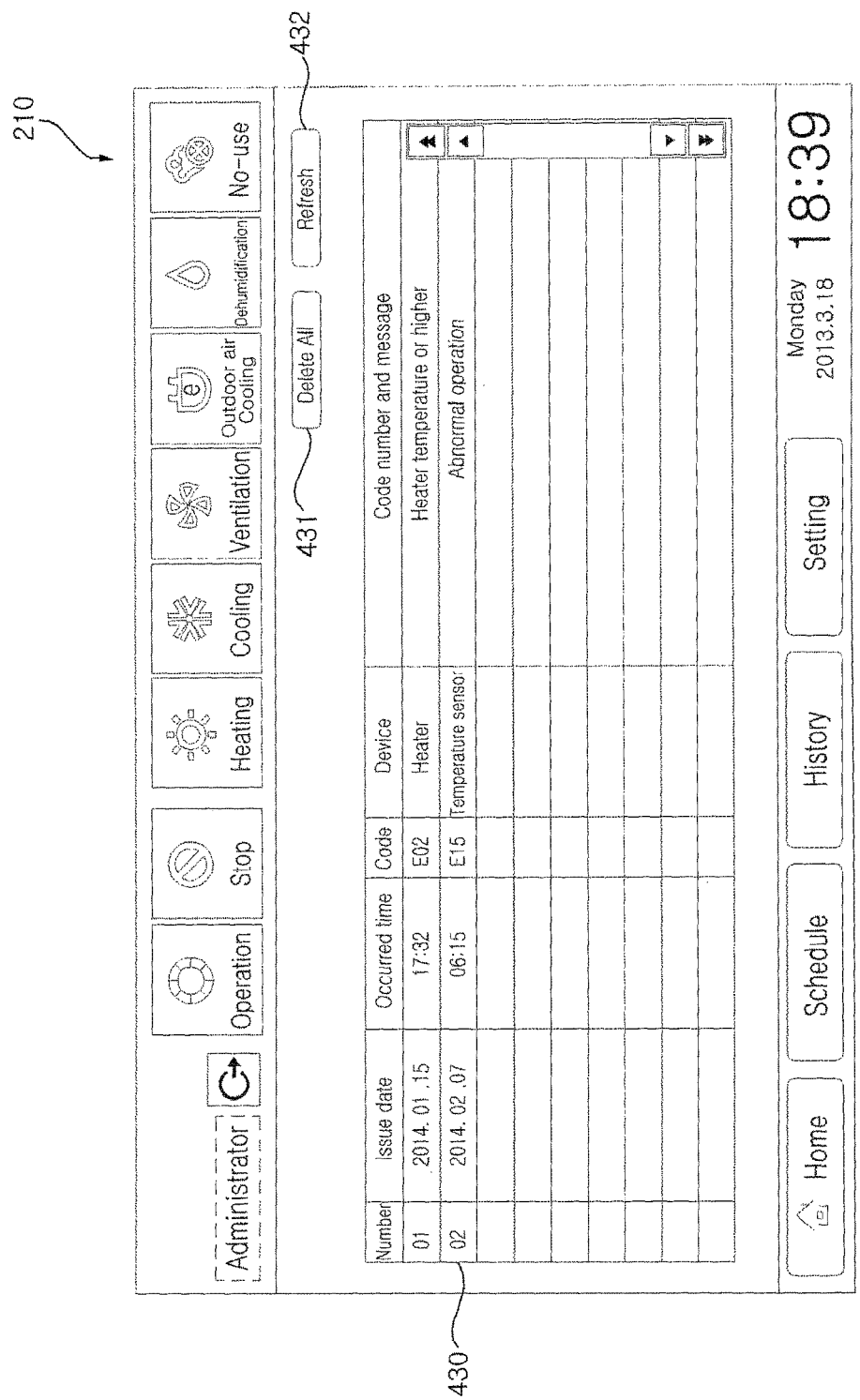
FIG. 27 is an exemplary diagram illustrating an embodiment of a screen on which history information of the interface unit is displayed in the air conditioning system in accordance with an embodiment of the present invention.

FIG. 27 is an exemplary diagram illustrating an embodiment of a screen on which history information of the interface unit is displayed in the air conditioning system in accordance with an embodiment of the present invention.

As illustrated in FIG. 27, when a history key 293 is selected in the main menu, error information 430 about the AHU 1 is displayed.

The control unit 111 receives error data generated in the AHU 1 from the controller 4, stores the error data in the data unit 116, and displays the error information 430 based on the error data. In this case, the control unit 111 outputs a warning regarding the generation of the error in the AHU 1.

A number is assigned to the error information 430 in order of an error occurred. A date and time when the error was generated is displayed, and code regarding the error and information about a device in which the error was generated are displayed. Furthermore, a code number or message related to the generated error is displayed.

When a refresh key 432 is selected, error information 430 updated based on newly received data is displayed. If new error data is received, when the refresh key 432 is selected, the new error data is added to the error information 430.

When a delete all key 431 is selected, all the data within the error information 430 is deleted and reset. Errors occurred before the a delete all key 431 are accumulated and stored in a list form and preserved for a set period.

Figure 28:
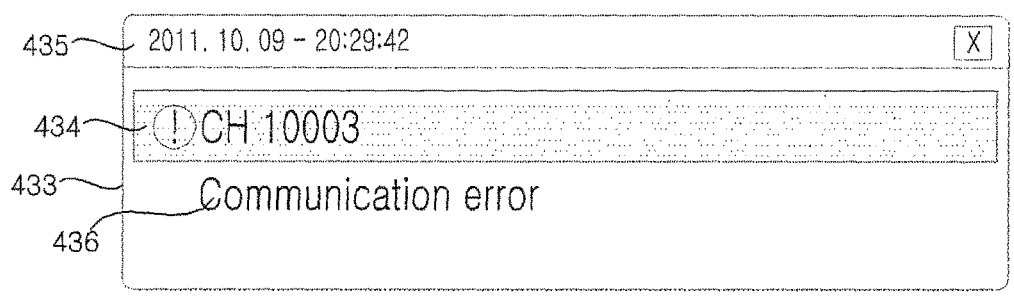
FIG. 28 is an exemplary diagram illustrating an embodiment of a screen to which warning is output when an error is generated in the interface unit of the air conditioning system in accordance with an embodiment of the present invention.

FIG. 28 is an exemplary diagram illustrating an embodiment of a screen to which warning is output when an error is generated in the interface unit of the air conditioning system in accordance with an embodiment of the present invention.

As illustrated in FIG. 28, if an error is generated in the AHU 1, the interface unit 5 outputs a notice message 433 in response to error data received from the controller 4.

A date and the time 435 when the error was generated, error code 434, and an error message 436 for the error code are displayed in the notice message 433.

Accordingly, the air conditioning system in accordance with an embodiment of the present invention includes the AHU configured to circulate indoor air and by controlling return air, exhaust air, outdoor air, and supply air and control an indoor temperature by controlling a circulation temperature. Accordingly, heat efficiency can be improved, and temperature control and return air control can be performed at the same time. The air conditioning system includes the controller configured to control the AHU. Accordingly, management becomes facilitated by monitoring the operating state of the AHU through the interface unit that is the input/output unit of the controller and that may be detachable and also controlling the operation of the AHU.

An object of the present invention is to provide an air conditioning system configured to provide a comfortable indoor environment by effectively controlling an indoor temperature while circulating air by controlling internal air circulated indoors and the introduction of external air and to add, separate, or remove a required part depending on an indoor environment.

In an aspect of the present invention, an air conditioning system includes an air handling unit (AHU) configured to control outdoor air that is externally supplied, exhaust air that is discharged from indoors to outdoors, and return air that is circulated indoors and supplied again, control the outdoor air or mixed air of the return air and the outdoor air at a set temperature, and supply cool/warm supply air indoors, at least one outdoor unit configured to supply a refrigerant to the AHU, a controller configured to control the AHU through communication with the outdoor unit, and an interface unit configured to operate as an input/output unit of the controller, wherein the interface unit outputs a control menu and a monitoring menu in accordance with functions of the AHU changed according to a configuration of a plurality of devices forming the AHU.

The interface unit displays setting menus for the plurality of devices forming the AHU, sets basis data for controlling the plurality of the devices in response to data received through the setting menus, inputs the set basis data to the controller.

The air conditioning system in accordance with an embodiment of the present invention ventilates the interior of a room by controlling the amount of air that is indoors circulated, discharged air, and air received from the outside, controls an indoor temperature using a temperature of outdoor air, and controls an indoor temperature by performing a heat exchange on mixed air. Furthermore, a plurality of devices forming the AHU is configured and controlled regardless of the type of plurality of devices, and a control menu is changed and displayed in accordance with a function of the AHU that is changed depending on the configuration of the plurality of devices. Accordingly, the air conditioning system has advantages in that it can provide diversity in installing the AHU, improve efficiency of the AHU by effectively controlling installed elements, and also improve convenience and efficiency in management.

While some exemplary embodiments of the present invention have been described with reference to the accompanying drawings, those skilled in the art may change and modify the present invention in various ways without departing from the essential characteristics of the present invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioning system, comprising:
an air handling unit (AHU) configured to: control outdoor air that is externally supplied, exhaust air that is discharged from indoors to outdoors, and return air that is circulated indoors and supplied again, control the outdoor air or mixed air of the return air and the outdoor air, and supply cool/warm supply air indoors, the AHU including a plurality of devices;
at least one outdoor unit configured to provide a refrigerant to the AHU;
a controller configured to control the AHU by communicating with the outdoor unit; and
an interface configured to operate as an input/output device, the interface to display a control menu and a monitoring menu based on functions of the AHU changed according to a configuration of the plurality of devices of the AHU, and
wherein the interface classifies functions into functions of the AHU that are executable and functions of the AHU that are not executable, based on the configuration of the plurality of devices,
the interface displays the classified functions, and menu items for the functions that are not executable are deactivated, and
the interface displays setting menus for the plurality of devices of the AHU.

2. The air conditioning system of claim 1, wherein the interface sets data for controlling the plurality of devices in response to data received through the setting menus, and the interface inputs the set data to the controller.

3. The air conditioning system of claim 2, wherein when setting for the plurality of devices is performed and the data for the plurality of devices is set, the interface determines whether each of the plurality of devices operates normally.

4. The air conditioning system of claim 2, wherein the interface differently configures menus according to a user, an administrator, or an installer, based on login rights, and the interface displays the configured menus.

5. The air conditioning system of claim 4, wherein:
the interface displays an operation menu for controlling operation of the AHU and the monitoring menu for outputting an operating state of the AHU in real time for all login rights.

6. The air conditioning system of claim 4, wherein the interface differently displays the setting menus for the plurality of devices, as the control menu, based on the login right,
wherein the setting menus include submenus including administrator setting menus for controlling the operation of the AHU and system setting menus for setting a basic value or basic control value of each device at the AHU.

7. The air conditioning system of claim 6, wherein the interface displays all of the setting menus when the login right corresponds to the installer, and the interface displays the administrator setting menus except the system setting menus when the access right corresponds to the administrator.

8. The air conditioning system of claim 1, wherein the interface sets a range in which each of the plurality of devices operates as the data regardless of a model and a type for each device and controls the plurality of devices.

9. The air conditioning system of claim 1, wherein the plurality of devices include a sensor, a valve, a damper, and a fan.

10. The air conditioning system of claim 1, wherein the interface outputs a warning based on an error or erroneous connection when received data exceeds a settable range with respect to functions of the AHU or the data for controlling the plurality of devices.

11. The air conditioning system of claim 1, wherein when the plurality of devices is changed, the interface provides a new control menu and a new monitoring menu for the AHU based on the changed plurality of devices by removing information regarding a removed device or adding and setting information regarding a new device.

12. The air conditioning system of claim 1, wherein the interface is detachably configured at the controller, and the interface is connected to the controller using a wired or wireless communication method.

13. The air conditioning system of claim 1, wherein the interface sets a schedule pattern for each day-of-the-week, the interface sets an operation schedule of the AHU based on schedule data to which a plurality of the schedule patterns has been applied, and the interface provides the set operation schedule to the controller.

14. The air conditioning system of claim 1, wherein the interface receives error data of the AHU and stores an error history, the error history including a date of the error, a time of the error, code, and information regarding a device that generated the error.

15. The air conditioning system of claim 1, wherein the interface receives, from the controller, data of the AHU and the outdoor unit, and the interface displays the monitoring menu and the control menu using graphics.

16. The air conditioning system of claim 1, wherein the interface displays, on the monitoring menu, a flow of the exhaust air, the outdoor air, the return air, and the supply air of the AHU.

17. The air conditioning system of claim 1, wherein the interface displays, on the monitoring menu, an image or an icon that corresponds to each of the plurality of devices of the AHU and the outdoor unit based on location of each of the devices.

18. The air conditioning system of claim 17, wherein the interface changes a shape and a location of the image or the icon of each device in the monitoring menu when a configuration of the plurality of devices changes, and the interface displays, on the monitoring menu, the changed shape and changed location.

19. The air conditioning system of claim 17, wherein the interface changes at least one of a shape and a color of the image or the icon based on an operation shape of each of the devices in response to data received from the controller, and the interface displays at least one of the shape and the color, and outputs, in real time, an operating state of the AHU.

20. The air conditioning system of claim 1, wherein the interface displays a setting menu for a sensor.

* * * * *